US010475366B2

(12) United States Patent
Sako et al.

(10) Patent No.: US 10,475,366 B2
(45) Date of Patent: Nov. 12, 2019

(54) DISPLAY DEVICE AND METHOD FOR DRIVING DISPLAY DEVICE

(71) Applicant: Japan Display Inc., Tokyo (JP)

(72) Inventors: Kazuhiko Sako, Tokyo (JP); Tsutomu Harada, Tokyo (JP)

(73) Assignee: Japan Display Inc., Tokyo (JP)

( * ) Notice: Subject to any disclaimer, the term of this patent is extended or adjusted under 35 U.S.C. 154(b) by 143 days.

(21) Appl. No.: 15/839,146

(22) Filed: Dec. 12, 2017

(65) Prior Publication Data

US 2018/0166002 A1 Jun. 14, 2018

(30) Foreign Application Priority Data

Dec. 14, 2016 (JP) .................................. 2016-242482

(51) Int. Cl.
*G09G 3/20* (2006.01)
*G09G 3/34* (2006.01)
*G09G 3/36* (2006.01)
*G02F 1/133* (2006.01)

(52) U.S. Cl.
CPC .......... *G09G 3/2003* (2013.01); *G02F 1/133* (2013.01); *G09G 3/2074* (2013.01); *G09G 3/3413* (2013.01); *G09G 3/3426* (2013.01); *G09G 3/3607* (2013.01); *G09G 2310/0243* (2013.01); *G09G 2310/0264* (2013.01)

(58) Field of Classification Search
CPC .... G09G 3/3426; G09G 3/3413; G09G 3/342; G09G 2320/062; G09G 2320/0633; G09G 2320/064; G09G 2320/0646; G09G 3/3406; G09G 3/34
See application file for complete search history.

(56) References Cited

U.S. PATENT DOCUMENTS

2010/0220048 A1* 9/2010 Yamamura ........... G09G 3/3426
345/102
2011/0292018 A1* 12/2011 Kubota ................ G09G 3/3426
345/211

(Continued)

FOREIGN PATENT DOCUMENTS

JP 2013-246426 A 12/2013
JP 2015-210461 A 11/2015
JP 2016-188883 A 11/2016

*Primary Examiner* — Dennis P Joseph
(74) *Attorney, Agent, or Firm* — K&L Gates LLP

(57) ABSTRACT

A display device includes: an image display panel having a display area; a light source device configured to illuminate the image display panel with light sources; and a controller configured to control a lighting amount of each light source. The display area includes segment areas each illuminated by one or more of the light sources. Each segment area includes subsegment areas. The controller is configured to: calculate luminance required for each subsegment area, based on an image signal for each subsegment area; temporarily set luminance values of the respective segment areas for determining the lighting amounts of the light sources based on maximum luminance among the required luminance values of the respective subsegment areas of each segment area; and reset, based on at least the maximum luminance, the luminance value of at least the segment area adjacent to the corresponding subsegment area having the required luminance of the maximum luminance.

16 Claims, 22 Drawing Sheets

(56) References Cited

U.S. PATENT DOCUMENTS

2012/0139974 A1* 6/2012 Sakai .................. G09G 3/3426
    345/690
2015/0317934 A1   11/2015 Takasaki et al.
2016/0203770 A1*  7/2016 Yoshizawa ......... G03B 21/2026
    345/690
2016/0293087 A1   10/2016 Sako et al.

* cited by examiner

FIG.17

|  | [h=0] | [h=1] | [h=2] | [h=3] | [h=4] | [h=5] | [h=6] |
|---|---|---|---|---|---|---|---|
| [v=0] | 0 | 0 | 0 | 50 | 40 | 0 | 0 |
| [v=1] | 0 | 0 | 50 | 100 | 40 | 20 | 0 |
| [v=2] | 0 | 40 | 80 | 25 | 20 | 0 | 0 |
| [v=3] | 0 | 0 | 0 | 0 | 0 | 0 | 0 |

Y
↑
└→ X

|  | [h=0] | [h=1] | [h=2] | [h=3] | [h=4] | [h=5] | [h=6] |
|---|---|---|---|---|---|---|---|
| [v=0] | 0 | 0 | 0 | 50 | 40 | 0 | 0 |
| [v=1] | 0 | 0 | 60 | 125 | 40 | 20 | 0 |
| [v=2] | 0 | 60 | 80 | 0 | 20 | 0 | 0 |
| [v=3] | 0 | 0 | 0 | 0 | 0 | 0 | 0 |

| 0 | 0 | 0 | 0 | 0 | 0 | 0 | 0 | 0 | 0 | 0 | 0 | 0 | 0 |
|---|---|---|---|---|---|---|---|---|---|---|---|---|---|
| 0 | 0 | 0 | 0 | 0 | 0 | 0 | 30 | 40 | 0 | 0 | 0 | 0 | 0 |
|   | 0 | 0 | 0 | 0 | 0 | 100 | 50 | 40 | 40 | 0 | 0 | 0 |   |
|   | 0 | 0 | 0 | 0 | 0 | 50 | 50 | 40 | 30 | 0 | 0 | 0 |   |
| 0 | 0 | 0 | 0 | 80 | 70 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
|   | 0 | 0 | 0 | 0 | 0 | 0 | 0 | 0 | 0 | 0 | 0 | 0 |   |
|   | 0 | 0 | 0 | 0 | 0 | 0 | 0 | 0 | 0 | 0 | 0 | 0 |   |

| 0 | 0 | 0 | 0 | 0 | 0 | 0 | 0 | 0 | 0 | 0 | 0 | 0 | 0 |
|---|---|---|---|---|---|---|---|---|---|---|---|---|---|
| 0 | 0 | 0 | 0 | 0 | 0 | 0 | 30 | 40 | 0 | 0 | 0 | 0 | 0 |
| 0 | 0 | 0 | 0 | 0 | 0 | 100 | 50 | 40 | 40 | 0 | 0 | 0 | 0 |
| 0 | 0 | 0 | 0 | 0 | 0 | 50 | 50 | 40 | 30 | 0 | 0 | 0 | 0 |
| 0 | 0 | 0 | 0 | 80 | 70 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |

FIG.32

|  | [h=0] | | [h=1] | | [h=2] | | [h=3] | | [h=4] | | [h=5] | | [h=6] | |
|---|---|---|---|---|---|---|---|---|---|---|---|---|---|---|
| [v=0] | 0 | 0 | 0 | 0 | 0 | 0 | 0 | 30 | 40 | 0 | 0 | 0 | 0 | 0 |
| [v=1] | 0 | 0 | 0 | 0 | 0 | 0 | 100 | 50 | 40 | 40 | 0 | 0 | 0 | 0 |
| [v=2] | 0 | 0 | 0 | 0 | 80 | 70 | 0 | 0 | 0 | 0 | 0 | 0 | 0 | 0 |
| [v=3] | 0 | 0 | 0 | 0 | 0 | 0 | 0 | 0 | 0 | 0 | 0 | 0 | 0 | 0 |

DISPLAY DEVICE AND METHOD FOR DRIVING DISPLAY DEVICE

CROSS-REFERENCE TO RELATED APPLICATIONS

This application claims priority from Japanese Application No. 2016-242482, filed on Dec. 14, 2016, the contents of which are incorporated by reference herein in its entirety.

BACKGROUND

1. Technical Field

The present invention relates to a display device and a method for driving the display device.

2. Description of the Related Art

Display devices employing local dimming technology include multi-display devices that control an area illuminated by a backlight in a manner dividing the area into a plurality of segment areas (for example, Japanese Patent Application Laid-open Publication No. 2013-246426). When a large light quantity is required for a part of a display area of such a display device using the local dimming technology, the light quantity is sometimes supplemented by additional light sources located in the periphery of a light source corresponding to the part. In general, a routine to assign light quantities to the light sources supplementing the light quantity from the periphery is fixed, and has no relation with the luminance distribution of the part that requires the large light quantity in the display area. As a result, only a particular light source is lit up to supplement the light quantity from the periphery, which may cause a load on the particular light source. In addition, unevenness of the light quantity represented by the luminance distribution of the part that requires the large light quantity sometimes disagrees with the locations of the light sources that supplement the light quantity of the part from the periphery. In such cases, if the display output image is updated such that the part requiring the large light quantity shifts away from the positions corresponding to the light sources that supplement the light quantity of the part with light from the periphery, a light source different from the light source having supplemented the light quantity from the periphery is suddenly lit up. Consequently, the sudden change in the luminance distribution sometimes causes deterioration in display quality.

For the foregoing reasons, there is a need for a display device and a method for driving the display device that can further reduce the load on the light source and that enable display output with higher display quality.

SUMMARY

According to an aspect, a display device includes: an image display panel having a display area in which display is controlled based on an image signal; a light source device configured to illuminate the image display panel with a plurality of light sources; and a controller configured to control a lighting amount of each of the light sources based on the image signal. The display area includes a plurality of segment areas each illuminated by one or more of the light sources. Each of the segment areas includes a plurality of subsegment areas that are obtained by further dividing the segment area. The controller is configured to: calculate luminance required for each of the subsegment areas, based on the image signal for each of the subsegment areas; temporarily set luminance values of the respective segment areas for determining the lighting amounts of the light sources based on maximum luminance among the required luminance values of the respective subsegment areas included in each of the segment areas; and reset, based on at least the maximum luminance among the required luminance values of the respective subsegment areas included in each of the segment areas, the luminance value of at least the segment area adjacent to the corresponding subsegment area having the required luminance of the maximum luminance.

BRIEF DESCRIPTION OF THE DRAWINGS

FIG. 17 is a schematic diagram illustrating an example of the luminance of the segment areas after being reset;

FIG. 32 is a schematic diagram illustrating a setting example of the segment areas and the subsegment areas of the image display panel according to the fifth modification.

DETAILED DESCRIPTION

Figure 1:
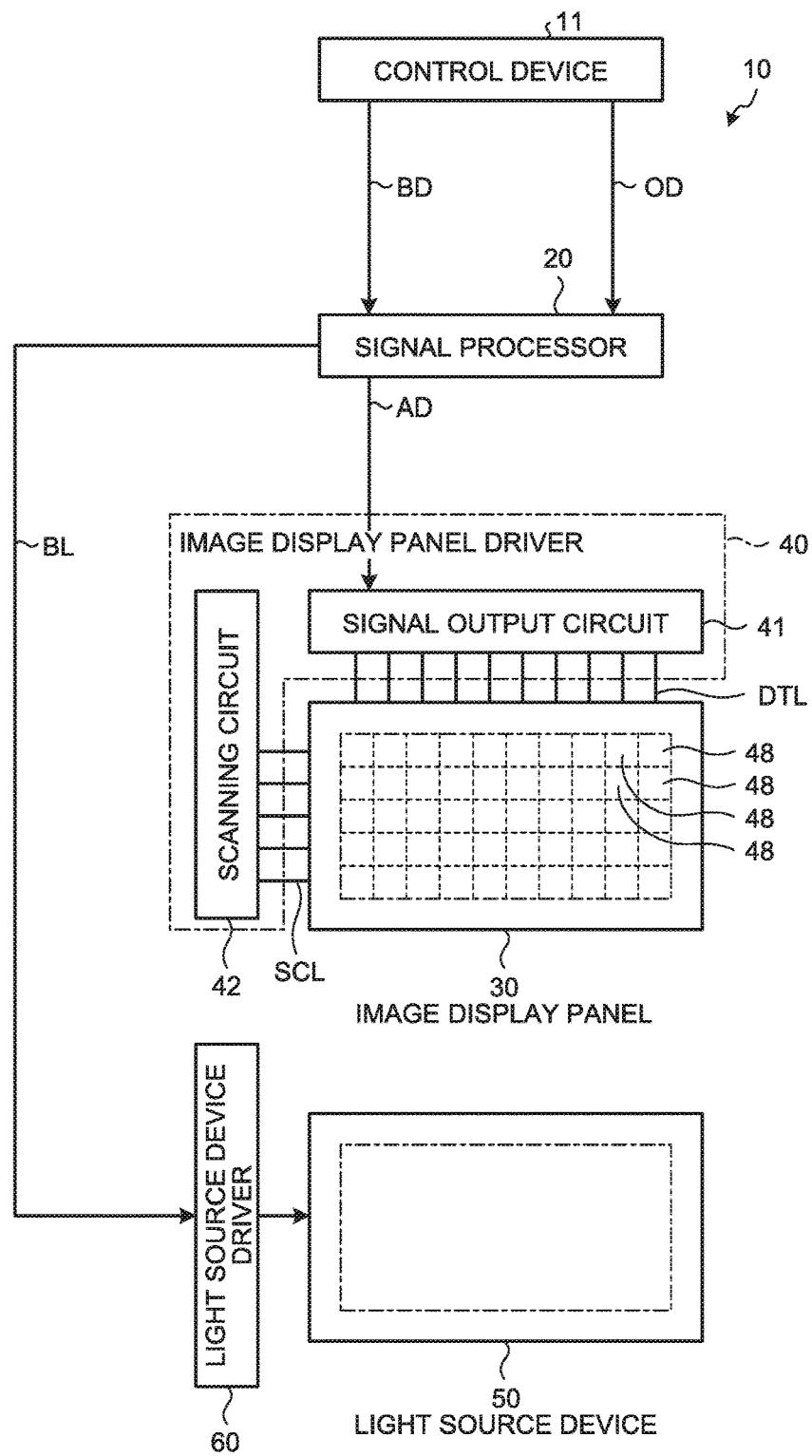
FIG. 1 is a block diagram illustrating an exemplary configuration of a display device according to a first embodiment of the present invention.

The following describes embodiments for carrying out the present invention in detail with reference to the drawings. The present invention is not limited to the description of the embodiments to be given below. Components to be described below include those that are easily conceivable by those skilled in the art, and those that are substantially the same. The components to be described below can also be combined as appropriate. The disclosure is merely an example, and the present invention naturally encompasses appropriate modifications easily conceivable by those skilled in the art while maintaining the gist of the invention. To further clarify the description, widths, thicknesses, shapes, and the like of various parts may be schematically illustrated in the drawings as compared with actual aspects thereof. However, they are merely examples, and interpretation of the invention is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

1. First Embodiment

Figure 2:
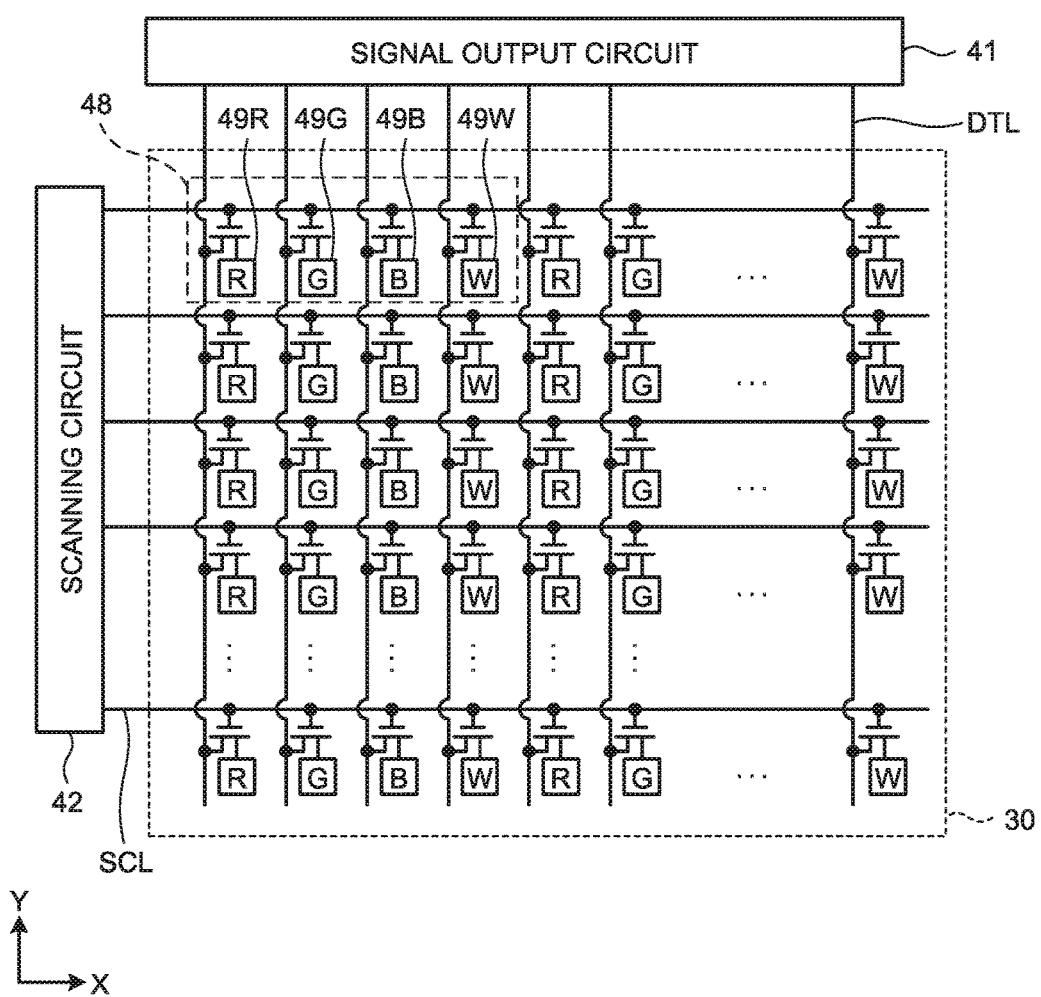
FIG. 2 is a diagram illustrating a pixel array of an image display panel according to the first embodiment.

FIG. 1 is a block diagram illustrating an exemplary configuration of a display device according to a first embodiment of the present invention. FIG. 2 is a diagram illustrating a pixel array of an image display panel according to the first embodiment. As illustrated in FIG. 1, a display device 10 includes a signal processor 20, an image display panel (display unit) 30, an image display panel driver 40, a light source device 50, and a light source device driver 60. The signal processor 20 receives an unprocessed signal BD serving as an input signal of an original image and control data OD from a control device 11, and outputs a processed signal AD and a light source drive signal BL to control operations of the display device 10. The image display panel (display unit) 30 has a display area in which display is controlled on the basis of the processed signal AD serving as an image signal, and displays an image in the display area. The image display panel driver 40 controls driving of the image display panel 30. The light source device 50 serves as a backlight that illuminates the image display panel 30 from the back side thereof. The light source device driver 60 controls drive of the light source device 50. The control device 11, the signal processor 20, and the light source device driver 60 are configured as, for example, semiconductor integrated circuits (ICs). The control device 11, the signal processor 20, and the light source device driver 60 may be integrated into one semiconductor integrated circuit (IC), or may be individually configured as semiconductor integrated circuits (ICs) different from one another. The present invention is not limited by the configuration of the control device 11, the signal processor 20, and the light source device driver 60.

The signal processor 20 is an arithmetic processor that controls operations of the image display panel 30 and the light source device 50. The signal processor 20 is coupled to the image display panel driver 40 for driving the image display panel 30 and the light source device driver 60 for driving the light source device 50. The signal processor 20 performs arithmetic processing on the basis of, for example, the signals received from the control device 11 to generate the processed signal AD and the light source drive signal BL. Specifically, the signal processor 20 converts the unprocessed signal BD into the processed signal AD. The unprocessed signal BD is a signal for outputting an image reproduced, for example, in a first color, a second color, and a third color. The processed signal AD is a signal for outputting an image reproduced in the first color, the second color, the third color, and a fourth color on the image display panel 30. The signal processor 20 thus generates the processed signal AD. The signal processor 20 outputs the generated processed signal AD to the image display panel driver 40. The signal processor 20 generates the light source drive signal BL on the basis of the unprocessed signal BD and the control data OD. The light source drive signal BL is a signal for controlling the quantity of light from the light source device 50 illuminating the image display panel 30 that operates in accordance with the processed signal AD. The signal processor 20 outputs the light source drive signal BL to the light source device driver 60. The unprocessed signal BD is, for example, an RGB signal. The processed signal AD is, for example, an RGBW signal. The control data OD includes, for example, data indicating segment areas and subsegment areas (to be described later) and signals for control, such as a clock signal.

As illustrated in FIG. 1, a plurality of pixels 48 are arranged in a two-dimensional matrix (in a row-column configuration) in the image display panel 30. FIG. 1 illustrates an example in which the pixels 48 are arranged in a matrix (row-column configuration) in a two-dimensional XY-coordinate system on a display surface of the image display panel 30 serving as the display area. In this example, the row direction corresponds to the X-direction, and the column direction corresponds to the Y-direction.

As illustrated in FIG. 2, each of the pixels 48 includes a first sub-pixel 49R, a second sub-pixel 49G, a third sub-pixel 49B, and a fourth sub-pixel 49W. The first sub-pixel 49R displays a first primary color (for example, red). The second sub-pixel 49G displays a second primary color (for example, green). The third sub-pixel 49B displays a third primary color (for example, blue). The fourth sub-pixel 49W displays a fourth color (specifically, white). In this manner, each of the pixels 48 arranged in a row-column configuration in the image display panel 30 includes the first sub-pixel 49R that displays the first color, the second sub-pixel 49G that displays the second color, the third sub-pixel 49B that displays the third color, and the fourth sub-pixel 49W that displays the fourth color. The first color, the second color, the third color, and the fourth color are not limited to the first primary color, the second primary color, the third primary color, and white, but only need to be different colors from one another, such as complementary colors. The fourth sub-pixel 49W that displays the fourth color is preferably brighter than the first sub-pixel 49R that displays the first color, the second sub-pixel 49G that displays the second color, and the third sub-pixel 49B that displays the third color, when irradiated with the same light source lighting amount. In the following description, the first sub-pixel 49R, the second sub-pixel 49G, the third sub-pixel 49B, and the fourth sub-pixel 49W will be each called a sub-pixel 49 when they need not to be distinguished from one another.

The display device 10 is more specifically a transmissive color liquid crystal display device. As illustrated in FIG. 2, the image display panel 30 is a color liquid crystal display panel in which a first color filter for transmitting the first primary color is disposed between the first sub-pixel 49R and an image viewer, a second color filter for transmitting the second primary color is disposed between the second sub-pixel 49G and the image viewer, and a third color filter for transmitting the third primary color is disposed between the third sub-pixel 49B and the image viewer. The image display panel 30 has no color filter disposed between the fourth sub-pixel 49W and the image viewer. In this case, a large gap is formed on the fourth sub-pixel 49W. Because of this, a transparent resin layer instead of the color filter may be provided on the fourth sub-pixel 49W. This can keep the large gap from being formed on the fourth sub-pixel 49W.

The image display panel driver 40 illustrated in FIGS. 1 and 2 is included in a controller of the present embodiment, and includes a signal output circuit 41 and a scanning circuit 42. In the image display panel driver 40 uses the signal output circuit 41 to hold video signals and sequentially output them to the image display panel 30. The signal output circuit 41 is electrically coupled to the image display panel 30 through signal lines DTL. The image display panel driver 40 uses the scanning circuit 42 to select the sub-pixel 49 in the image display panel 30 and to control on and off of a switching element (such as a thin-film transistor (TFT)) for controlling operations (light transmittance) of the sub-pixel 49. The scanning circuit 42 is electrically coupled to the image display panel 30 through scanning lines SCL.

The light source device 50 illuminates the image display panel with a plurality of light sources. The light source device 50 is disposed on the back side of the image display panel 30, and emits light toward the image display panel 30 to illuminate the image display panel 30. The light source device driver 60 controls, for example, the light quantity of the light output from the light source device 50. The light source device driver 60 is included in the controller of the present embodiment. Specifically, the light source device driver 60 sets the light quantity (intensity of light) of light for irradiating the image display panel 30 to a light quantity corresponding to the light source drive signal BL output from the signal processor 20 by adjusting a value of current supplied to the light source device 50 on the basis of the light source drive signal BL.

Figure 3:
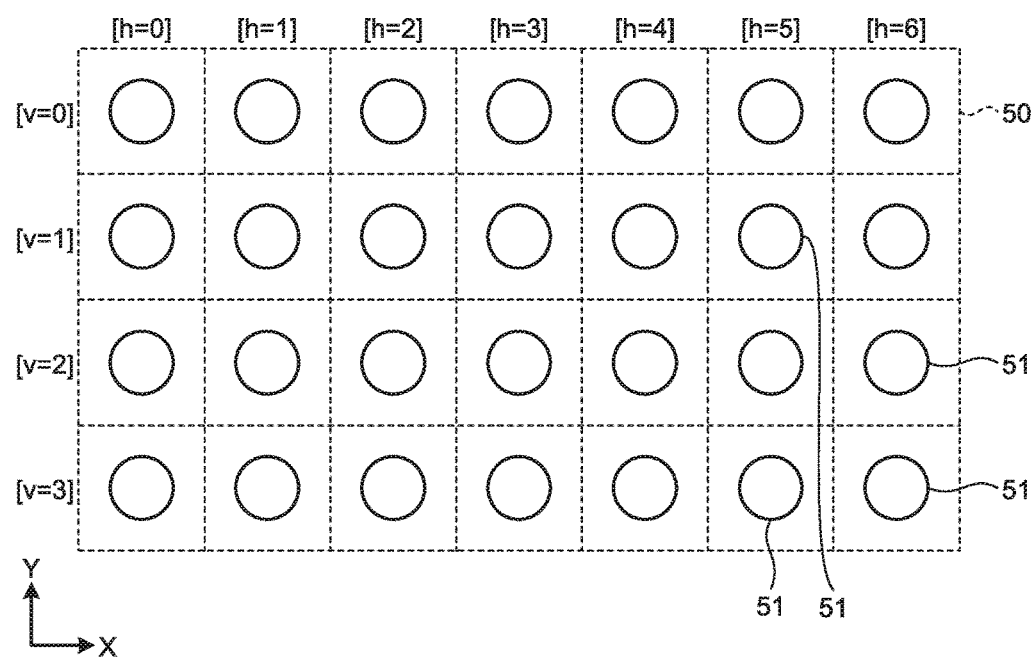
FIG. 3 is a schematic diagram illustrating a configuration example of a light source device.

FIG. 3 is a schematic diagram illustrating a configuration example of the light source device 50. The light source device 50 has a plurality of light source columns in which a plurality of light sources (such as light sources 51) are arranged along one direction. The term "one direction" as used herein refers to at least one of the X-direction and the Y-direction. The light source device 50 of the present embodiment has the light source columns and light source rows in which a plurality of light sources are arranged along two directions of the X-direction and the Y-direction. Specifically, as illustrated, for example, in FIG. 3, the light source device 50 has the light sources 51 arranged in a two-dimensional matrix (in a row-column configuration). The light sources 51 are, for example, light-emitting diodes (LEDs) of the same color (such as white). FIG. 3 illustrates an example in which the light sources 51 are arranged one in each block identifiable by 28 (=7×4) XY-coordinates that are identifiable by X-directional coordinates of [h=0] to [h=6] and Y-directional coordinates of [v=0] to [v=3]. In the present embodiment, this block corresponds to a segment area (to be described later). The following description will be made using the same kind of XY-coordinates in some cases. FIG. 3 illustrates the light source device 50 in which seven light sources 51 are arranged along the X-direction, and four light sources 51 are arranged along the Y-direction. This is, however, a mere schematic illustration. The arrangement and the number of the light sources 51 included in the light source device 50 are not limited to the example illustrated in FIG. 3, but can be changed as appropriate.

Figure 4:
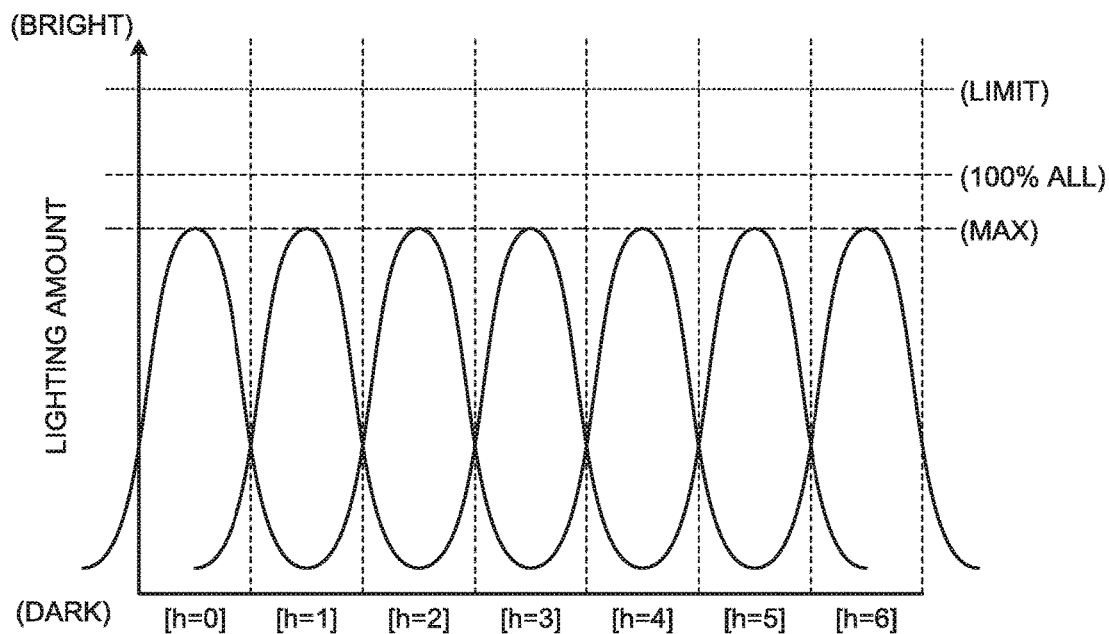
FIG. 4 is a diagram illustrating an exemplary relation between luminance of each of a plurality of light sources arranged along a row direction and a luminance distribution of the entire light source row.
Figure 5:
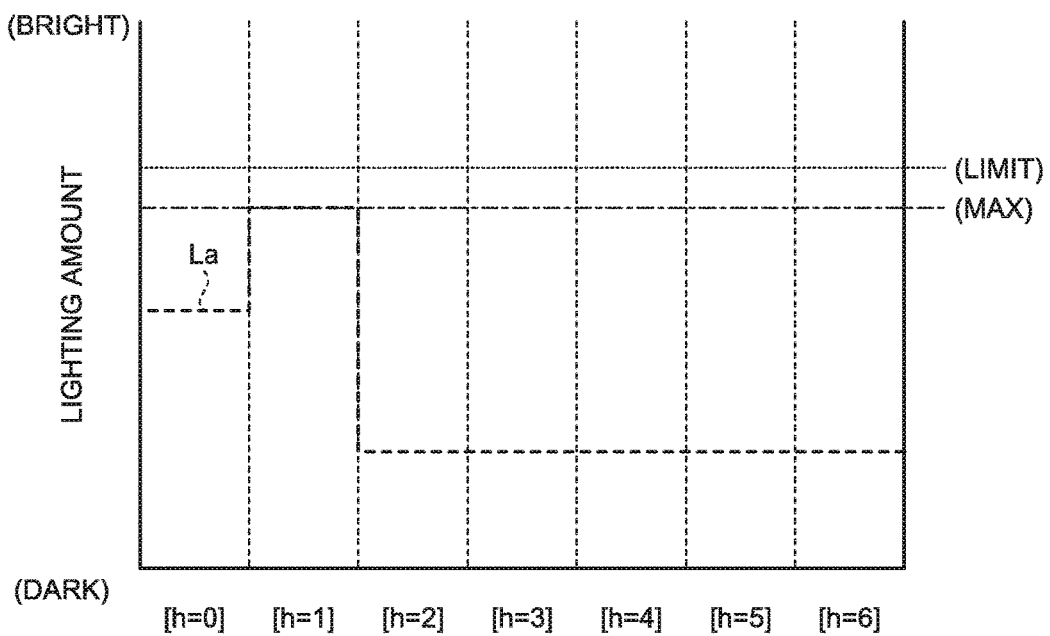
FIG. 5 is a graph schematically illustrating a flow of determination processing of lighting amounts of the light sources based on the luminance distribution of the light source device.
Figure 6:
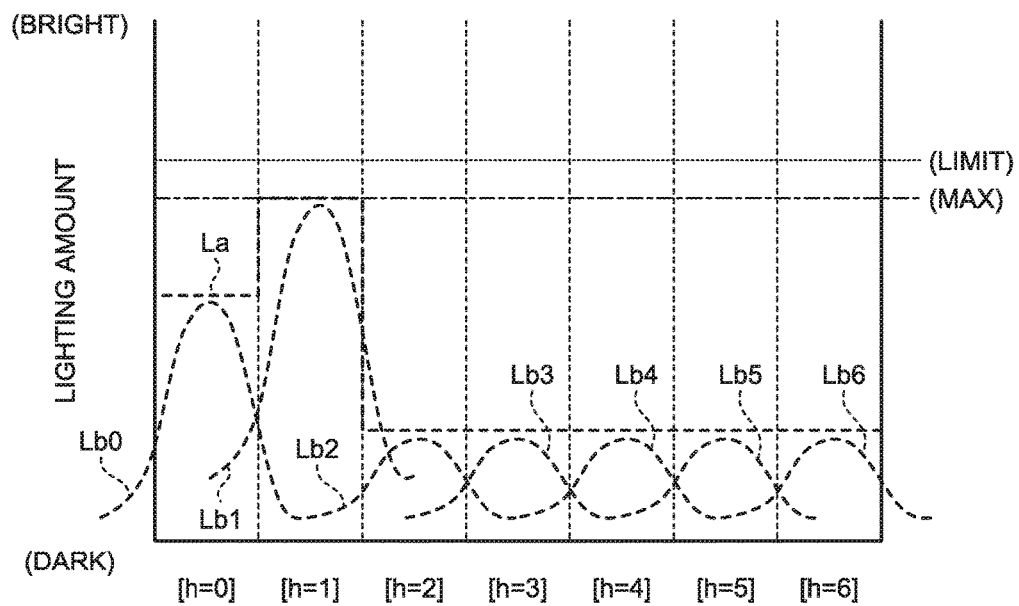
FIG. 6 is a graph schematically illustrating the flow of the determination processing of the lighting amounts of the light sources based on the luminance distribution of the light source device.

FIG. 4 is a diagram illustrating an exemplary relation between luminance of each of the light sources 51 arranged along a row direction and a luminance distribution of the entire light source row. Each of the light sources 51 can be changed in luminance within a range from a first upper limit luminance (MAX) to the minimum luminance (LIGHT-OFF) set in advance. The light source 51 illuminates adjacent blocks with part of the light when the light is on. That is, the luminance of each block is affected by the light from the light source 51 disposed in the block and the light from light sources 51 disposed in the adjacent blocks. For example, if all the light sources 51 are lit up at the first upper limit luminance, the luminance of each block has full light luminance (100% ALL) higher than the first upper limit luminance.

The light source 51 has a performance to be lit up at luminance higher than the first upper limit luminance. For example, the light source 51 in the present embodiment has a performance to be lit up in a state of increasing the luminance to a second upper limit luminance (LIMIT) higher than the first upper limit luminance. For example, assuming the first upper limit luminance (MAX) as the luminance of the light source 51 when the amount of current is 100 [%], the second upper limit luminance (LIMIT) is the luminance of the light source 51 when the amount of current is 125 [%]. However, limiting the luminance of the light source 51 when lit up to the first upper limit luminance brings about advantages, such as a reduction in power consumption and an increase in lifetime of the light source 51. That is, the first upper limit luminance is set in advance as luminance lower than the second upper limit luminance in order to reduce a load on the light source 51 to a level lower than that at the second upper limit luminance.

FIG. 4 illustrates the relation between the luminance of each of the light sources 51 arranged along the row direction and the luminance distribution of the entire light source row. The same applies to the relation between the luminance of each of the light sources 51 arranged along the column direction and the luminance distribution of the entire light source column. In the case of the light source column, lighting amounts of seven light sources 51 of [h=0] to [h=6] are replaced with lighting amounts of four light sources 51 of [v=0] to [v=3]. If the light sources 51 are arranged in a two-dimensional matrix as in the present embodiment, the relation between the lighting amount and the luminance is also two-dimensional. That is, a light source 51 of a certain block is affected by other light sources 51 in blocks two-dimensionally adjacent to the certain block.

The following describes the basic concept of a method for controlling the lighting amount of the light source 51 in a process related to the light source drive signal BL among processes performed by the signal processor 20. FIGS. 5 to 9 are graphs schematically illustrating a flow of determination processing of the lighting amounts of the light sources 51 on the basis of the luminance distribution of the light source device 50. To illustrate the concept in a more easily understandable manner, FIGS. 5 to 9 simplify the explanation by illustrating the relation between the luminance of each of the light sources 51 arranged along the row direction and the light quantity of the entire light source row. In the case of the present embodiment, however, the relation between the lighting amount and the luminance is two-dimensional.

First, the signal processor 20 obtains required luminance on a block-by-block basis. The signal processor 20 determines the required luminance according to a display output image to be displayed on the image display panel 30 illuminated by the light source arranged in each block, more specifically, according to a display output image to be displayed on a segment area-by-segment area basis (to be described later), for example. In FIGS. 5 to 9 and FIG. 11 to be described later, a symbol La is assigned to the required luminance.

Then, the signal processor 20 temporarily sets the lighting amounts of the light sources 51 on a block-by-block basis according to the required luminance. Specifically, the signal processor 20 temporarily sets the lighting amounts of the light sources 51 so that the peak luminance of each of the light sources 51 is substantially equal to the required luminance, for example. In FIGS. 6 to 9 and FIG. 11 to be described later, symbols Lb0, Lb1, Lb2, Lb3, Lb4, Lb5, and Lb6 are assigned to the lighting amounts of the light sources 51, which are temporarily set on a block-by-block basis, for the blocks of [h=0], [h=1], [h=2], [h=3], [h=4], [h=5], and [h=6], respectively.

Figure 7:
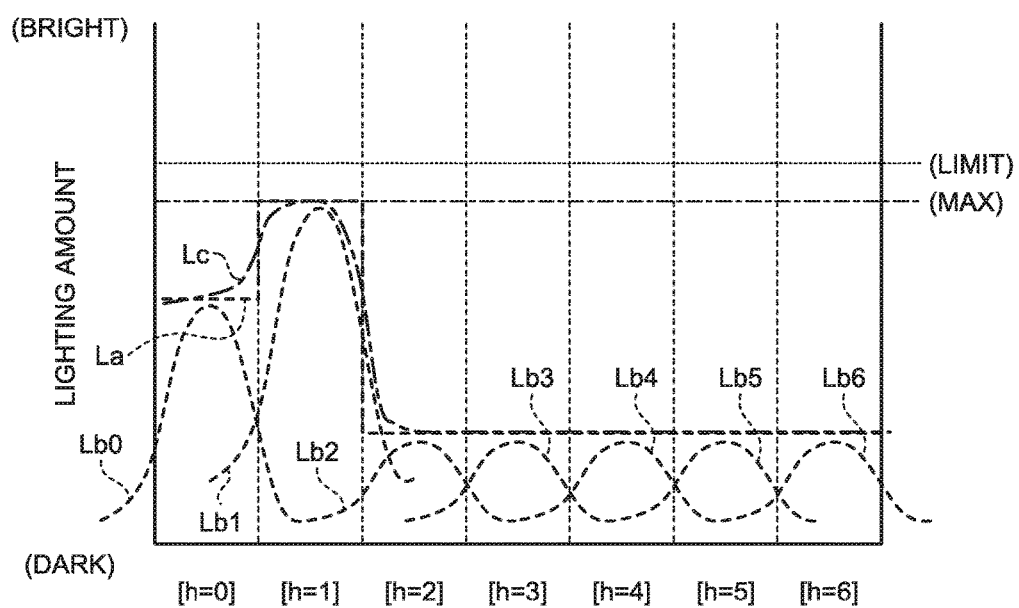
FIG. 7 is a graph schematically illustrating the flow of the determination processing of the lighting amounts of the light sources based on the luminance distribution of the light source device.
Figure 8:
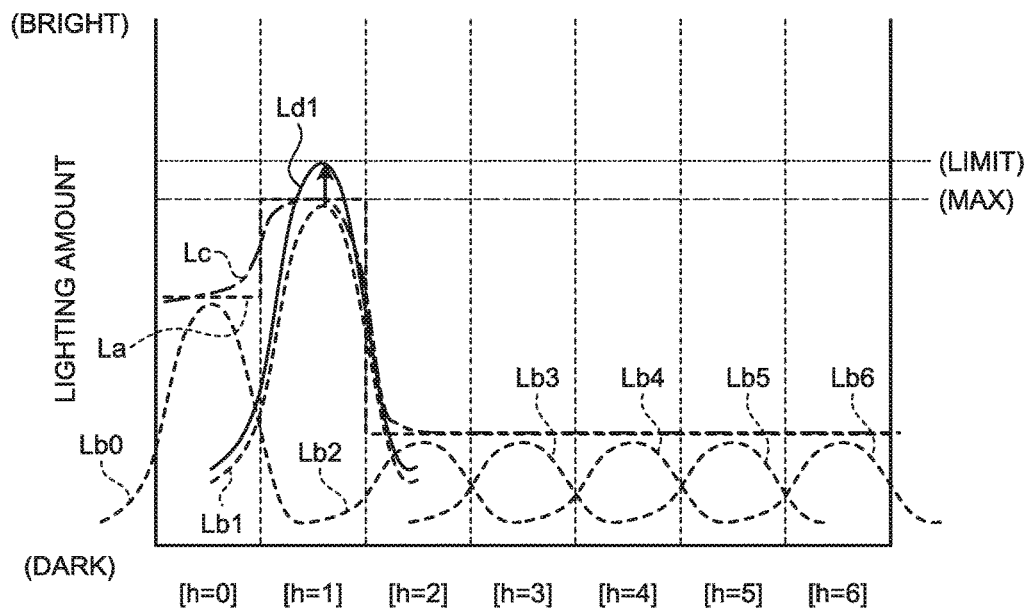
FIG. 8 is a graph schematically illustrating the flow of the determination processing of the lighting amounts of the light sources based on the luminance distribution of the light source device.
Figure 9:
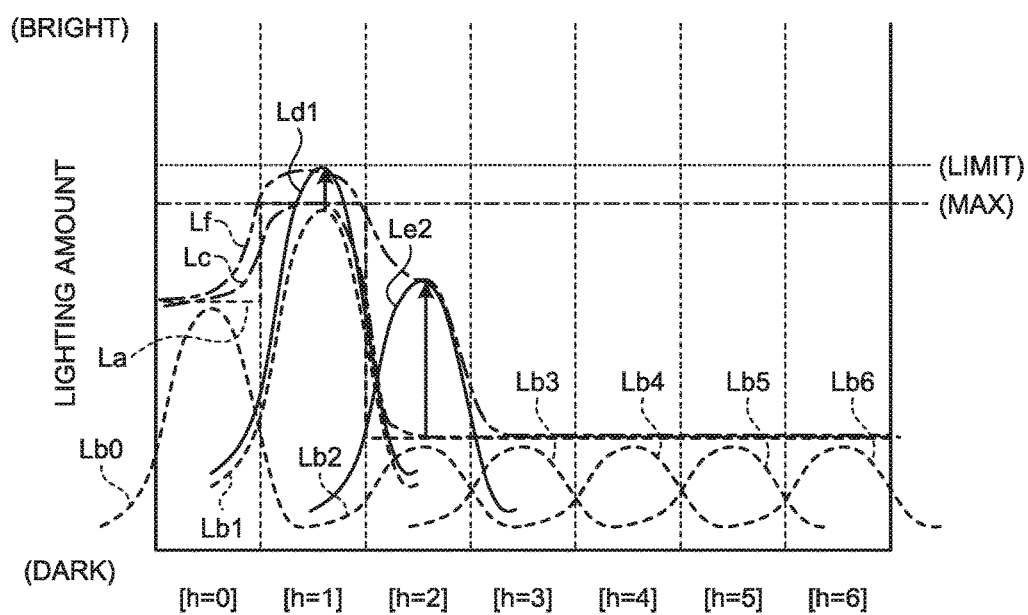
FIG. 9 is a graph schematically illustrating the flow of the determination processing of the lighting amounts of the light sources based on the luminance distribution of the light source device.

Then, the signal processor 20 calculates a temporary lighting amount luminance distribution corresponding to the temporarily set lighting amounts of the light sources 51. Specifically, for example, the signal processor 20 compares the temporarily set lighting amounts of the light sources 51 with data (such as reference data 22f to be described later) indicating various determining factors in calculation of the luminance distribution, and thus calculates the luminance distribution comprehensively given to the display area by the light sources 51. Examples of the various determining factors include a relation (bright/dark) between the lighting amount of each of the light sources 51 and the light quantity obtained in the display area, and influences between adjacent light sources 51. The relation (bright/dark) between the lighting amount of each of the light sources 51 and the light quantity obtained in the display area can be obtained in advance by, for example, preliminary measurement. In FIGS. 7 to 9, a symbol Lc is assigned to the temporary lighting amount luminance distribution corresponding to the temporarily set lighting amounts of the light sources 51.

Then, the signal processor 20 performs correction of the lighting amount of the light source 51 (light source lighting amount correction) for obtaining the required luminance on the basis of a difference between the required luminance and the temporary lighting amount luminance distribution. Specifically, the signal processor 20 performs the correction of the lighting amount so as to increase the lighting amount of the light source 51 of a block where the required luminance not included in the temporary lighting amount luminance distribution occurs. The required luminance in some part is not included in the temporary lighting amount luminance distribution. In FIGS. 8 and 9, a symbol Ld1 is assigned to the lighting amount of the light source 51 that has been corrected so as to increase from the lighting amount Lb1 in a block of [h=1] where the required luminance not included in the temporary lighting amount luminance distribution has occurred.

The correction of the lighting amount of the light source 51 of the block where the required luminance not included in the temporary lighting amount luminance distribution occurs is performed within the range up to the second upper limit luminance (LIMIT). After the light source lighting amount correction, the signal processor 20 calculates a luminance distribution corresponding to the lighting amount after being corrected, in the same scheme as that of the calculation of the temporary lighting amount luminance distribution. The required luminance of the block may not be included in the luminance distribution after being corrected, even after the lighting amount of the light source 51 of the block where the required luminance not included in the temporary lighting amount luminance distribution occurs is increased to the second upper limit luminance (LIMIT). In this case, the signal processor 20 performs adjacent light source lighting amount correction to ensure the required luminance by increasing the lighting amount of the light source 51 of a block adjacent to the block. In FIG. 9, a symbol Le2 is assigned to the lighting amount of the light source 51 that has been subjected to the adjacent light source lighting amount correction so as to increase from the lighting amount Lb2 in a block of [h=2] adjacent to the block of [h=1]. In FIG. 9, a symbol Lf is assigned to a luminance distribution calculated after the required luminance is ensured by the adjacent light source lighting amount correction performed so as to increase the lighting amount from the lighting amount Lb2 to the lighting amount Le2 in the block of [h=2].

Figure 10:
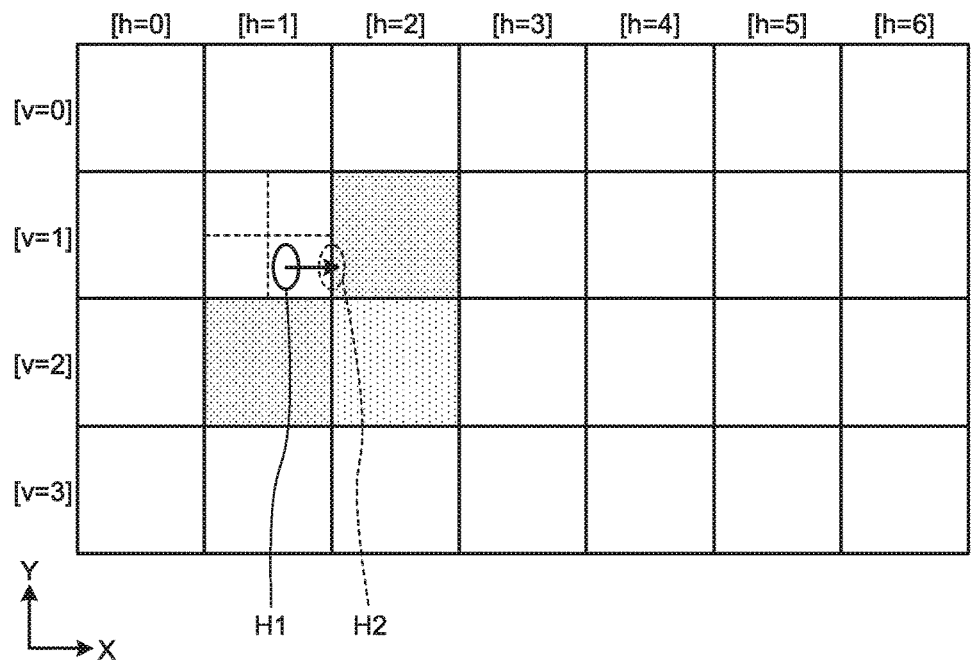
FIG. 10 is a diagram schematically explaining a method for selecting light sources to be changed in lighting amount.

The following describes the basic concept of a method for selecting the light sources 51 to be changed in lighting amount in the case of supplementing the light quantity from the periphery. FIG. 10 is a diagram schematically explaining the method for selecting the light sources 51 to be changed in lighting amount. For example, consider a case in which a high luminance output H1 is produced in a part of the display area (segment area) corresponding to the light source 51 of a block of [h=1], [v=1], as illustrated in FIG. 10. If the part is subsegmented into 2×2 parts, the high luminance output H1 is located in an area (subsegment area) adjacent to blocks on the side of the block of [h=2], [v=2]. In such a case, the blocks on the side of the block of [h=2], [v=2] is closer to the high luminance output H1 than that of [h=0], [v=0] is, and thus the light quantity can be more efficiently supplemented by using the light sources 51 of the blocks on the side of the block of [h=2], [v=2] than by using the light sources 51 of blocks on the side of the block of [h=0], [v=0]. If the display output image is changed such that the high luminance output H1 is moved to blocks on the side of the block of [h=2], [v=2], the moving amount required for the movement is smaller than that in the case where the high luminance output H1 is moved to blocks on the side of the block of [h=0], [v=0]. In FIG. 10, an example of the position of a high luminance output after the movement is represented by H2. If the display output image is changed as illustrated by the high luminance output H2, the blocks on the side of the block of [h=2], [v=2] are more probably required to have lighting amounts for producing the high luminance output H1 that has entered therein. If the blocks on the side of the block of [h=2], [v=2], the light sources 51 of which have not been lit up, need to produce the high luminance output H1, the light sources 51 of the blocks on the side of that of [h=2], [v=2] need to be suddenly lit up at high luminance. In contrast, if the light sources 51 of the blocks on the side of that of [h=2], [v=2] have been supplementing in advance the light quantity of the block of [h=1], [v=1], change in luminance caused by lighting up such the light sources 51 at high luminance is smaller than that caused by lighting up the light sources 51 that have not been lit up. Thus, the light source 51 to be changed in lighting amount is selected according to the location of the subsegment area in which the lighting amount for the output produced therein needs to be supplemented, and then the light quantity is supplemented from the periphery by changing the lighting amount of the selected light source 51. This reduces the probability of the change in luminance, and more easily prevents degradation of display quality caused by the sudden large change in luminance. In FIG. 10, relatively denser shading is applied to the block of [h=2], [v=1] and the block of [h=1], [v=2] that are considered to be appropriate as blocks where light sources 51 to be changed in lighting amount are disposed when the light quantity is supplemented from the periphery in the case where the high luminance output H1 is produced. Relatively less dense shading is applied to the block of [h=2], [v=2] that is considered to be appropriate next to the denser shaded blocks as a block where the light source 51 to be changed in lighting amount is disposed. Such selection of the light sources 51 can be employed in the adjacent light source lighting amount correction, and can also be employed in resetting of the temporarily set lighting amounts.

Figure 11:
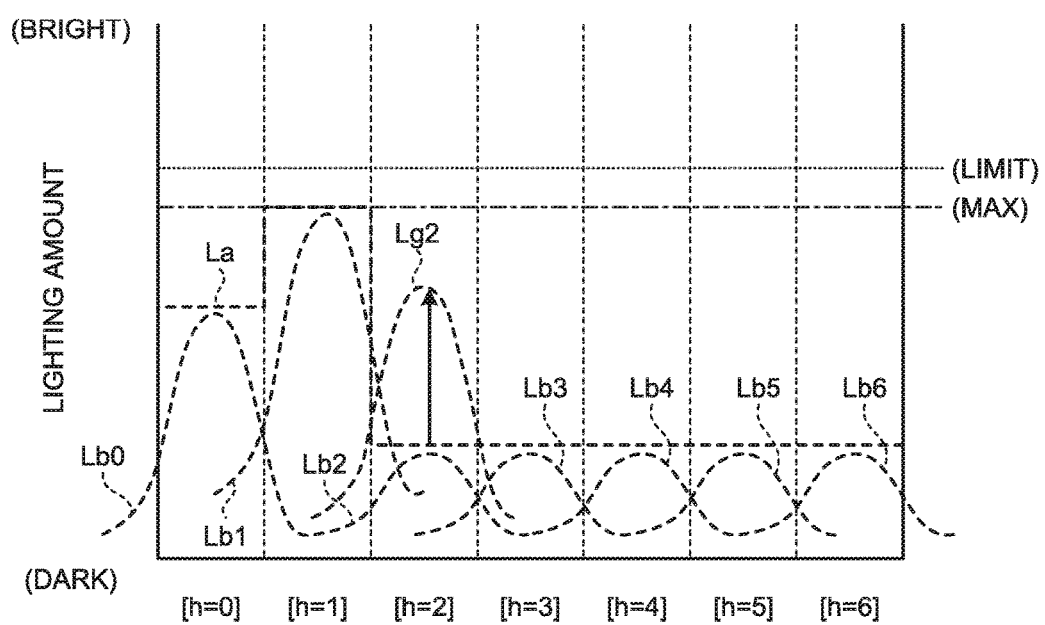
FIG. 11 is a graph illustrating an example of resetting of a temporary setting.

FIG. 11 is a graph illustrating an example of resetting of the temporary setting. After temporarily setting the lighting amounts of the light sources 51 (refer to FIG. 6), the signal processor 20 resets the temporary setting such that, among the lighting amounts temporarily set before performing the correction of the lighting amount (refer to FIG. 8) for increasing the lighting amount of the light source 51 of the block where the required luminance not included in the temporary lighting amount luminance distribution occurs, the lighting amount of a block adjacent to a block required to have higher luminance is increased as illustrated in FIG. 11. In this case, the block required to have higher luminance is the block of [h=1], and the block adjacent to the block required to have higher luminance is the block of [h=2], for example. This reduces the amount of correction required in the correction of the lighting amount (refer to FIG. 8) and the adjacent light source lighting amount correction (refer to FIG. 9). In FIG. 11, a symbol Lg2 is assigned to the lighting amount of the light source 51 of [h=2] that has been reset.

Figure 12:
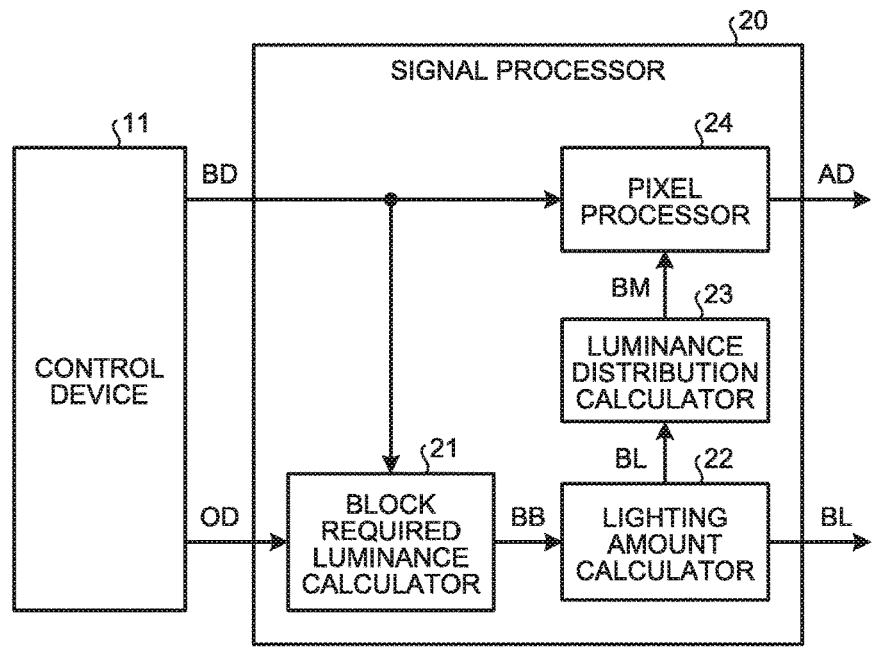
FIG. 12 is a functional block diagram illustrating a functional configuration example of a signal processor.

The following describes more in detail the signal processor 20 that outputs the light source drive signal BL serving as a signal for controlling each of the lighting amounts of the light sources. FIG. 12 is a functional block diagram illustrating a functional configuration example of the signal processor 20. The signal processor 20 serves as a block required luminance calculator 21, a lighting amount calculator 22, a luminance distribution calculator 23, and a pixel processor 24.

For each of the segment areas and the subsegment areas set on the basis of the control data OD, the block required luminance calculator 21 calculates required luminance, that is luminance required for each of the segment areas and the subsegment areas on the basis of the unprocessed signal BD. This required luminance corresponds to the required luminance described using FIG. 5 explained above.

Figure 14:
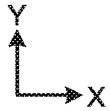
FIG. 14 is a schematic diagram illustrating an example of luminance required for a plurality of segment areas.
Figure 15:
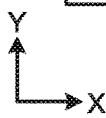
FIG. 15 is a schematic diagram illustrating an example of luminance required for a plurality of subsegment areas.

FIG. 14 is a schematic diagram illustrating an example of luminance required for the segment areas. In FIG. 14, a numerical value illustrated in a rectangle representing the segment area indicates the required luminance for the segment area (to be described later). In FIG. 14 and FIGS. 15 and 17 to be described later, each of the rectangles sectioned by solid lines represents the segment area. The segment area is a part of the display area in which the image display panel 30 performs the display output of an image. The display area can be divided into a plurality of segment areas. In other words, an area obtained by combining all the segment areas serves as the display area. Each of the pixels 48 included in the image display panel 30 is included in any of the segment areas.

The segment areas are arranged along at least one direction. For example, the segment areas are arranged along two orthogonal or intersecting directions. In the present embodiment, the segment areas identifiable by 28 (=7×4) XY-coordinates that are identifiable by X-directional coordinates of [h=0] to [h=6] and Y-directional coordinates of [v=0] to [v=3] are set on the basis of the control data OD. That is, the control data OD includes information indicating the setting of the segment areas. The block required luminance calculator 21 sets the segment areas on the basis of the control data OD. As exemplified by the correspondence relation between FIGS. 3 and 14, the light source 51 is individually provided in each of the segment areas. In this manner, each of the light sources 51 is assigned to a corresponding one of the segment areas. Each of the segment areas is illuminated by one or more of the light sources.

FIG. 15 is a schematic diagram illustrating an example of luminance required for the respective subsegment areas. In FIG. 15, dashed lines represent dividing lines that divide the segment area into a plurality of subsegment areas. In FIG. 15, a numerical value illustrated in a rectangle representing the subsegment area indicates the required luminance for the subsegment area (to be described later). The subsegment area is a part of the segment area. One segment area can be divided into a plurality of subsegment areas. One subsegment area is an area including one or more of the pixels 48.

In the present embodiment, each of the segment areas includes four subsegment areas defined by two dividing lines, one of which halves the segment area in one of two orthogonal directions, the other of which halves the segment area in the other of the two orthogonal directions. In the present embodiment, one of the two dividing lines extends along the X-direction, and the other thereof extends along the Y-direction. Specifically, as illustrated, for example, in FIG. 15, the four subsegment areas included in one segment area are arranged in the X-direction and the Y-direction as 2×2 parts. FIG. 15 illustrates an example in which the two dividing lines divide the segment area into four equal parts. This is, however, a mere example, and the present invention is not limited thereto. For example, if the number of pixels 48 in the X-direction included in one segment area is an odd number, the numbers of pixels 48 in the respective subsegment areas arranged in the X-direction may differ from one another. If the number of pixels 48 in the Y-direction included in one segment area is an odd number, the numbers of pixels 48 in the respective subsegment areas arranged in the Y-direction may differ from one another.

Based on the image signal for each of the subsegment areas obtained by dividing the segment area into a plurality of parts, the block required luminance calculator 21 calculates the luminance required for the subsegment area. Specifically, the block required luminance calculator 21 calculates values of the required luminance according to gradation values of the sub-pixels 49 represented by the unprocessed signal BD. As an example, a case will be described where the unprocessed signal BD represents each color of the sub-pixels 49 as an 8-bit gradation value. The 8-bit gradation value can be expressed as a numerical value ranging from 0 as the minimum value to 255 as the maximum value. In the present embodiment, when the gradation value is equal to the maximum value, the luminance required for the light source 51 for illuminating the sub-pixel 49 is assumed to be the first upper limit luminance. The required luminance in this case is 100 [%]. When the gradation value is equal to the minimum value, the luminance required for the light source 51 for illuminating the sub-pixel 49 is assumed to be the minimum luminance. The required luminance in this case is 0 [%], which means a light-off state of the light source 51. In the present embodiment, if the required luminance is 100 [%], the full light luminance (100% ALL) is required. The block required luminance calculator 21 calculates the required luminance within the limit of the full light luminance (100% ALL) that is lower than the second upper limit luminance (LIMIT).

The block required luminance calculator 21 calculates the required luminance corresponding to the gradation value of the sub-pixel 49 represented by the unprocessed signal BD. For example, the block required luminance calculator 21 calculates the required luminance of the sub-pixel 49 having a gradation value (such as 127) at the center between the maximum value and the minimum value to be 50 [%]. The relation between the gradation value and the required luminance may be defined by predetermined data (such as data in a table format) stored in a storage device included in the block required luminance calculator 21, or may be calculated using a predetermined algorithm implemented in the block required luminance calculator 21. The block required luminance calculator 21 calculates the required luminance values corresponding to the gradation values of all the sub-pixels 49. The block required luminance calculator 21 determines the highest required luminance among the calculated required luminance values of the sub-pixels 49 included in one subsegment area as the required luminance of the one subsegment area. The block required luminance calculator 21 individually determines the required luminance for each of the subsegment areas. In FIG. 15, a numerical value illustrated in a rectangle representing a subsegment area indicates the required luminance of the subsegment area.

The block required luminance calculator 21 temporarily sets luminance values of the respective segment areas for determining the lighting amounts of the light sources 51 on the basis of the maximum luminance among the luminance values required for the respective subsegment areas included in each of the segment areas. Specifically, the block required luminance calculator 21 sets the highest required luminance among the calculated required luminance values of the subsegment areas included in one subsegment area as the required luminance of the one segment area. The block required luminance calculator 21 individually sets the required luminance for each of the segment areas. The block required luminance calculator 21 outputs, to the lighting amount calculator 22, temporary setting information BB indicating the required luminance of all the segment areas for which the temporary setting has been made. In FIG. 14, a numerical value illustrated in a rectangle representing a segment area indicates the required luminance of the segment area.

Figure 13:
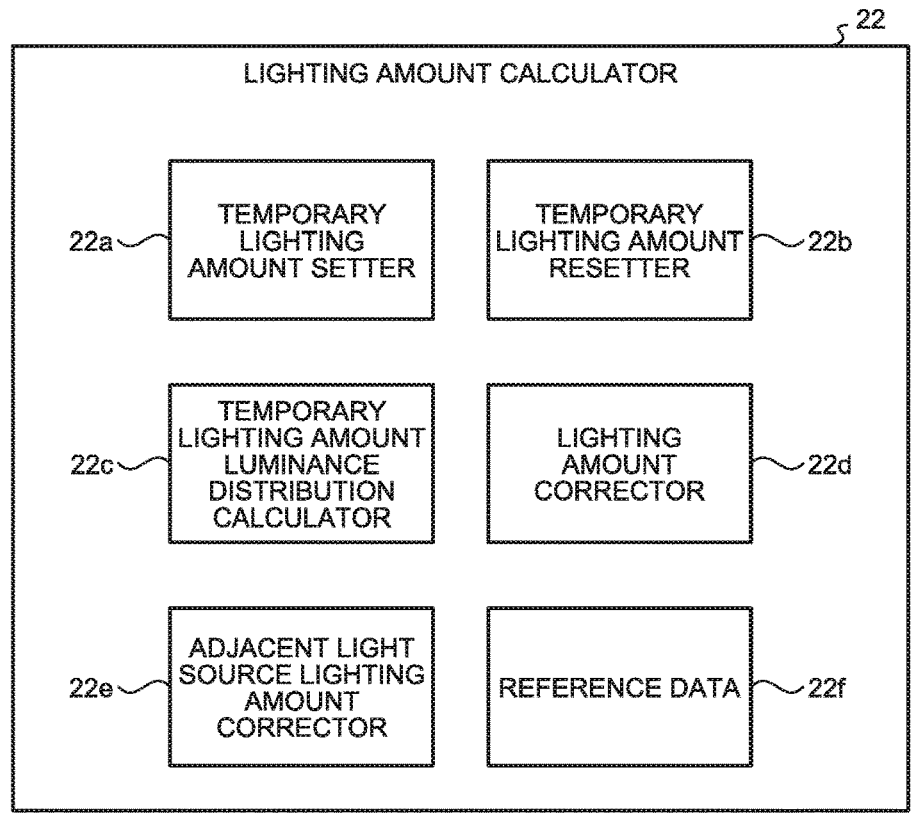
FIG. 13 is a subblock diagram of a lighting amount calculator.

FIG. 13 is a subblock diagram of the lighting amount calculator 22. The lighting amount calculator 22 outputs the light source drive signal BL on the basis of the required luminance indicated by the temporary setting information BB. Specifically, the lighting amount calculator 22 includes, for example, a temporary lighting amount setter 22a, a temporary lighting amount resetter 22b, a temporary lighting amount luminance distribution calculator 22c, a lighting amount corrector 22d, an adjacent light source lighting amount corrector 22e, and the reference data 22f.

The temporary lighting amount setter 22a temporarily sets the lighting amounts of the light sources 51 corresponding to the required luminance (light source lighting amount temporary setting). The lighting amounts temporarily set by the temporary lighting amount setter 22a correspond to the lighting amounts set through the temporary setting described above with reference to FIG. 6. Specifically, the temporary lighting amount setter 22a temporarily sets the lighting amounts of the respective light sources 51 so that, for example, the peak luminance of each of the light sources 51 arranged at locations corresponding to the respective segment areas is substantially equal to the required luminance of the corresponding one of the segment areas.

The temporary lighting amount resetter 22b calculates reset luminance from the luminance required for the subsegment areas. Specifically, the temporary lighting amount resetter 22b calculates the reset luminance, for example, by multiplying the required luminance of each of the subsegment areas by a predetermined coefficient (such as k1 or k2) for calculating the reset luminance. The lighting amounts corresponding to the luminance reset by the temporary lighting amount resetter 22b correspond to the lighting amounts set through the resetting described above with reference to FIG. 11.

Figure 16:
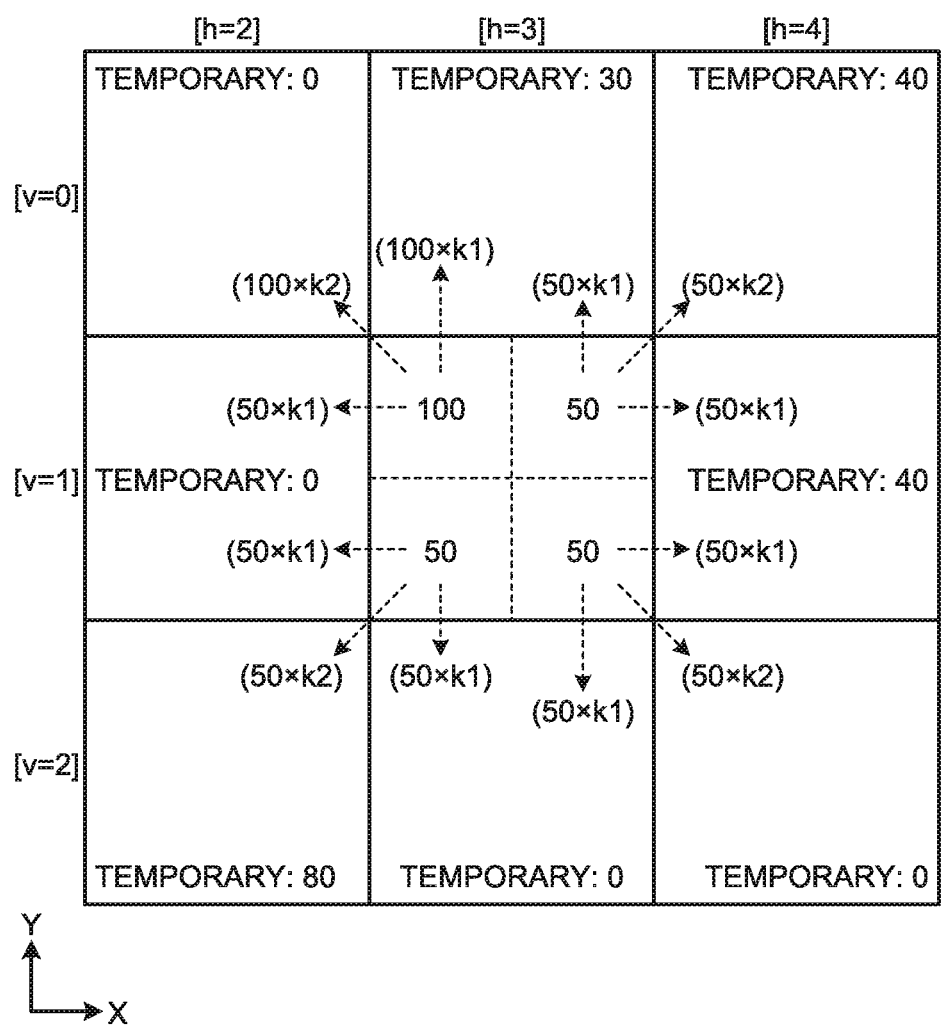
FIG. 16 is a schematic diagram illustrating a calculation example of required luminance of other segment areas based on the luminance required for the respective subsegment areas included in one segment area.
Figure 18:
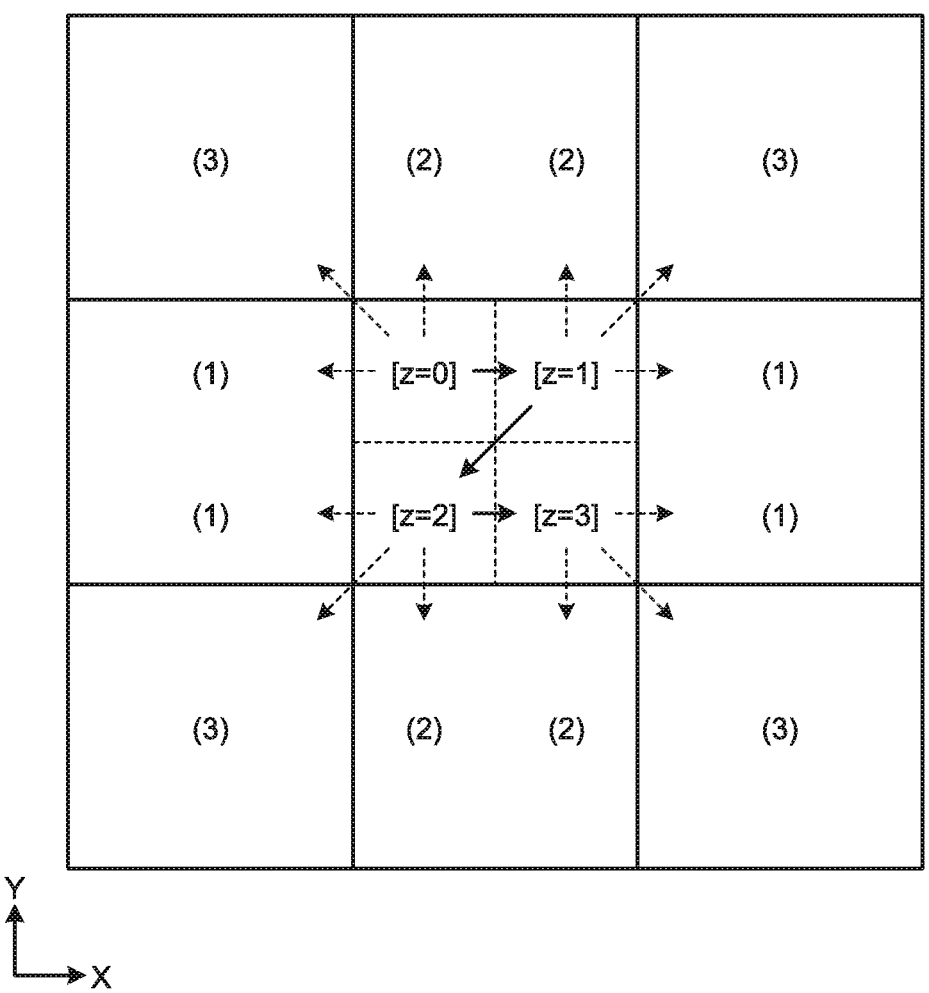
FIG. 18 is a diagram illustrating an example of a correspondence relation between a segment area where luminance is insufficient, a subsegment area exhibiting the maximum luminance in the segment area, and segment areas corresponding to positions of light sources to be subjected to adjacent light source lighting amount correction for increasing the lighting amounts in order to supplement the insufficient luminance, and an execution order of the light source lighting amount correction.
Figure 24:
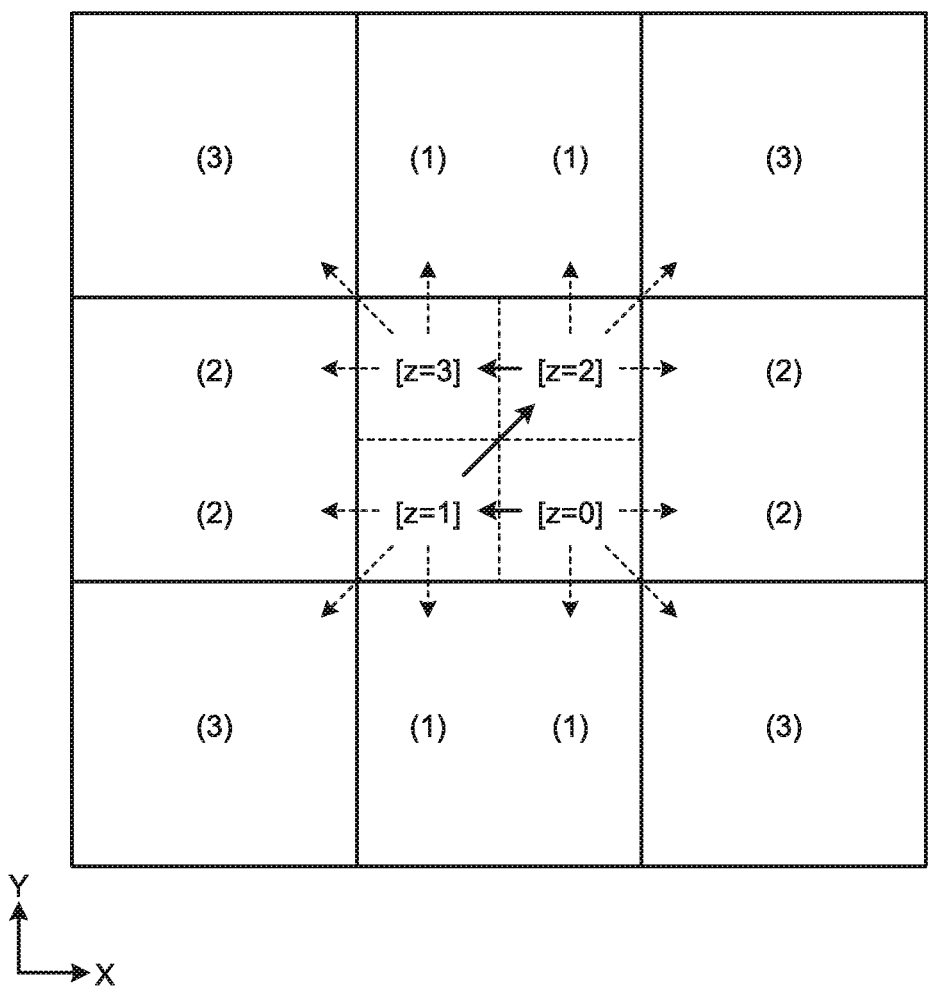
FIG. 24 is a diagram illustrating another example of the correspondence relation between the segment area where the luminance is insufficient, the subsegment area exhibiting the maximum luminance in the segment area, and the segment areas corresponding to the positions of the light sources to be subjected to the adjacent light source lighting amount correction for increasing the lighting amounts in order to supplement the insufficient luminance, and the execution order of the light source lighting amount correction.

FIG. 16 is a schematic diagram illustrating a calculation example of the required luminance of other segment areas based on the luminance required for the respective subsegment areas included in one segment area. FIG. 16 and FIGS. 18 and 24 to be described later illustrate a case of calculating the reset luminance from the required luminance of each of the four subsegment areas included in a segment area of [h=3], [v=1] located at the center among nine shaded segment areas in FIGS. 14 and 15. The present embodiment individually sets a first coefficient (k1) and a second coefficient (k2). The first coefficient (k1) is a coefficient for calculating the reset luminance of segment areas adjacent to a subsegment area in the X-direction and the Y-direction, and the second coefficient (k2) is a coefficient for calculating the reset luminance of a segment area adjacent to the subsegment area in an oblique direction different from the X-direction and the Y-direction. The first coefficient (k1) is a unique numerical value (such as 0.5) set within the range of, for example, 0.4 to 0.6. The second coefficient (k2) is a unique numerical value (such as 0) set within the range of, for example, 0 to 0.25. The numerical value ranges and the unique numerical values of these coefficients are mere examples, and are not limited thereto, and can be changed as appropriate.

The required luminance of one subsegment area of the four subsegment areas included in the segment area of [h=3], [v=1] located at the center is 100 [%]. Consequently, if, for example, k1=0.5, the reset luminance calculated by multiplying the required luminance of 100 [%] by the first coefficient (k1) is 50 [%]. If, for example, k2=0, the reset luminance calculated by multiplying the required luminance of 100 [%] by the second coefficient (k2) is 0 [%]. The one subsegment area is adjacent to a segment area of [h=3], [v=0] in the Y-direction. The one subsegment area is adjacent to a segment area of [h=2], [v=1] in the X-direction. Thus, the reset luminance (50 [%]) is calculated by multiplying the required luminance by the first coefficient (k1) as the reset luminance of each of these segment areas. The one subsegment area is adjacent to a segment area of [h=2], [v=0] in an oblique direction. Thus, the reset luminance (0 [%]) is calculated by multiplying the required luminance by the second coefficient (k2) as the reset luminance of this segment area.

The values of the required luminance of three subsegment areas among the four subsegment areas included in the segment area of [h=3], [v=1] located at the center is 50 [%]. Consequently, if, for example, k1=0.5, the reset luminance calculated by multiplying the required luminance of 50 [%] of the subsegment areas by the first coefficient (k1) is 25 [%]. If, for example, k2=0, the reset luminance calculated by multiplying the required luminance of 50 [%] by the second coefficient (k2) is 0 [%]. The three subsegment areas are adjacent to the segment area of [h=3], [v=0] or a segment area of [h=3], [v=2] in the Y-direction. The three subsegment areas are adjacent to the segment area of [h=2], [v=1] or a segment area of [h=4], [v=1] in the X-direction. Thus, the reset luminance (25 [%]) is calculated by multiplying the required luminance by the first coefficient (k1) as the reset luminance of each of these segment areas. The four subsegment areas are adjacent to the segment area of [h=2], [v=0], a segment area of [h=4], [v=0], a segment area of [h=2], [v=2], or a segment area of [h=4], [v=2] in oblique directions. Thus, the reset luminance (0 [%]) is calculated by multiplying the required luminance by the second coefficient (k2) as the reset luminance of each of these segment areas.

The coefficients for calculating the reset luminance may be set on the basis of the reference data 22f stored in a storage device included in the lighting amount calculator 22, or may be included in an algorithm implemented in the temporary lighting amount resetter 22b. The first and second coefficients in the present embodiment need not be individual coefficients, but may be unified into one coefficient. The calculation of the reset luminance using the second coefficient may be omitted.

The above description has exemplified the processing in the case of calculating the reset luminance values from the values of the required luminance of a plurality of subsegment areas included in one segment area. The temporary lighting amount resetter 22b sequentially or concurrently executes the same processing for all the segment areas. When the temporary lighting amount resetter 22b has completed the calculation of the reset luminance from the required luminance values of all the subsegment areas included in all the segment areas, the lighting amounts of the segment areas temporarily set by the temporary lighting amount setter 22a are separately kept.

The temporary lighting amount resetter 22b calculates a plurality of values of reset luminance for one segment area. In other words, a plurality of values of reset luminance calculated from the values of the required luminance of a plurality of subsegment areas sharing an adjacent segment area serve as the values of reset luminance for the segment area. For example, in FIGS. 16 and 18, two values of reset luminance are calculated for each of the segment area of [h=3], [v=0], the segment area of [h=3], [v=2], the segment area of [h=2], [v=1], and the segment area of [h=4], [v=1]. The temporary lighting amount resetter 22b calculates the reset luminance from the required luminance of a plurality of subsegment areas included in the corresponding segment area. Consequently, the number of values of reset luminance calculated for one segment area can exceed the number of values of reset luminance calculated from a plurality of subsegment areas included in one segment area. If a plurality of values of reset luminance is calculated for one segment area, the temporary lighting amount resetter 22b determines the highest value of the reset luminance as the reset luminance for the segment area.

FIG. 17 is a schematic diagram illustrating an example of the luminance of the segment areas after being reset. If the reset luminance calculated by multiplying the luminance required for a subsegment area by a predetermined coefficient is higher than the luminance of a segment area adjacent to the subsegment area, the temporary lighting amount resetter 22b resets the luminance of the segment area to the reset luminance. For example, the luminance of the segment area of [h=3], [v=0] has been set to 30 [%]. In contrast, as the reset luminance for the segment area of [h=3], [v=0], the reset luminance (50 [%]) is calculated from the required luminance (100 [%]) of one subsegment area included (at the upper left in FIG. 16) in the segment area of [h=3], [v=1]. In this case, the reset luminance (50 [%]) calculated from the required luminance of the subsegment area is higher than the luminance (30 [%]) of the segment area of [h=3], [v=0]. Consequently, the luminance of the segment area of [h=3], [v=0] is reset to the reset luminance (50 [%]). Following the same concept, the temporary lighting amount resetter 22b resets the luminance of a segment area where the calculated reset luminance is higher than the luminance having been set for the the segment area (refer to FIG. 14) to the reset luminance (refer to FIG. 17). In the example with reference to FIGS. 14 and 17, the luminance of the segment area of [h=3], [v=0] is reset from 30 [%] to 50 [%]. The luminance of a segment area of [h=1], [v=2] is reset from 0 [%] to 40 [%]. The luminance of the segment area of [h=3], [v=2] is reset from 0 [%] to 25 [%]. The luminance of a segment area of [h=5], [v=1] and the segment area of [h=4], [v=2] is reset from 0 [%] to 20 [%]. In this manner, based on the luminance required for subsegment areas, the temporary lighting amount resetter 22b resets the luminance of segment areas adjacent to the subsegment areas (adjacent light source lighting amount reset). For segment areas for which the luminance has not been reset, the luminance of the segment areas is kept at the luminance corresponding to the lighting amounts temporarily set by the temporary lighting amount setter 22a, that is, at the required luminance calculated by the block required luminance calculator 21.

The temporary lighting amount luminance distribution calculator 22c calculates the temporary lighting amount luminance distribution according to the lighting amounts in which the luminance after being reset by the temporary lighting amount resetter 22b is reflected. The temporary lighting amount luminance distribution calculated by the temporary lighting amount luminance distribution calculator 22c corresponds to the temporary lighting amount luminance distribution described above with reference to FIG. 7. Specifically, the temporary lighting amount luminance distribution calculator 22c obtains, for example, the lighting amounts of the respective light sources 51 corresponding to the luminance after being reset, compares these lighting amounts with the reference data 22f, and calculates the luminance distribution comprehensively given to the display area by the light sources 51 as the temporary lighting amount luminance distribution. The reference date 22f indicates the various determining factors in the calculation of the luminance distribution. The examples of the various determining factors include the relation (bright/dark) obtained in advance by, for example, preliminary measurement between the lighting amount of each of the light sources 51 and the light quantity obtained in the display area. The examples of the various determining factors also include influences between adjacent light sources 51.

If the required luminance values have been obtained for all the segment areas by the time when the temporary lighting amount luminance distribution is calculated, the lighting amount calculator 22 outputs the light source drive signal BL for lighting up the light sources 51 at lighting amounts corresponding to the luminance after being reset by the temporary lighting amount resetter 22b.

The lighting amount corrector 22d performs the correction of the lighting amounts of the light sources 51 (light source lighting amount correction) for obtaining the required luminance on the basis of the difference between the required luminance and the temporary lighting amount luminance distribution. The light source lighting amount correction performed by the lighting amount corrector 22d corresponds to the light source lighting amount correction described above with reference to FIG. 8. The lighting amount corrector 22d of the present embodiment corrects the lighting amounts of the light sources within a range equal to or lower than the second upper limit luminance (such as LIMIT). Based on at least the maximum luminance among the luminance values required for the respective subsegment areas included in a segment area for which the required luminance has not been obtained in the temporary lighting amount luminance distribution, the lighting amount corrector 22d of the present embodiment corrects the lighting amount of the light source illuminating the segment area.

Specifically, the lighting amount corrector 22d sets a representative point in the segment area for which the required luminance has not been obtained in the temporary lighting amount luminance distribution. The term "representative point" refers to luminance corresponding to a gradation value of one pixel 48 in a subsegment area with the required luminance of the maximum luminance among a plurality of subsegment areas included in one segment area. The pixel 48 with the gradation value employed as the representative point may be a pixel 48 exhibiting the highest gradation value in this subsegment area, or may be a pixel 48 extracted by sampling. The lighting amount corrector 22d calculates luminance required for performing display output of the representative point that has been set. This calculation of the luminance is based on the same concept as that of the calculation of the required luminance performed by the block required luminance calculator 21. The lighting amount corrector 22d acquires the luminance (current luminance) of the segment area for which the representative point has been set among values of luminance of a plurality of segment areas indicated by the temporary lighting amount luminance distribution. The lighting amount corrector 22d calculates the difference between the luminance required for performing display output of the representative point and the current luminance. The lighting amount corrector 22d determines whether the difference can be supplemented by correcting the lighting amount of the light source 51 corresponding to this segment area within the upper limit of the second upper limit luminance (LIMIT). Specifically, the lighting amount corrector 22d calculates, for example, a luminance distribution that can be obtained by correcting the lighting amount of the light source 51 corresponding to this segment area to a lighting amount equal to or lower than the second upper limit luminance (LIMIT) using the same method as that used by the temporary lighting amount luminance distribution calculator 22c to calculate the temporary lighting amount luminance distribution, and determines whether the required luminance of this segment area can be obtained by using the calculated luminance distribution. If the required luminance of this segment area is determined to be obtainable, the lighting amount corrector 22d corrects the lighting amount of the light source 51 corresponding to this segment area to the lowest lighting amount with which the required luminance of this segment area can be obtained. If the required luminance of this segment area is determined to be not obtainable, the lighting amount corrector 22d sets the lighting amount of the light source 51 corresponding to this segment area to the second upper limit luminance (LIMIT), and outputs reference information to the adjacent light source lighting amount corrector 22e. The reference information includes information indicating an amount of luminance by which the lighting amount of the light source 51 corresponding to this segment area is still insufficient even after being set to the second upper limit luminance (LIMIT), information indicating the position of the segment area where the lighting amount is insufficient, and information indicating the position of a subsegment area exhibiting the maximum luminance in this segment area.

When the required luminance become obtainable for all the segment areas as a result of the light source lighting amount correction, the lighting amount calculator 22 outputs the light source drive signal BL for lighting up the light sources 51 at lighting amounts corresponding to the luminance after being corrected by the lighting amount corrector 22d.

If the reference information is received from the lighting amount corrector 22d, the adjacent light source lighting amount corrector 22e performs the adjacent light source lighting amount correction. The adjacent light source lighting amount correction performed by the adjacent light source lighting amount corrector 22e corresponds to the adjacent light source lighting amount correction described above with reference to FIG. 9. Specifically, the adjacent light source lighting amount corrector 22e determines the light source 51 to be increased in lighting amount for supplementing the insufficiency in lighting amount on the basis of the information indicating the position of the segment area where the lighting amount is insufficient and the information indicating the position of the subsegment area exhibiting the maximum luminance in this segment area among pieces of information included in the reference information.

To increase the lighting amount of the light source 51 corresponding to a segment area adjacent to the subsegment area exhibiting the maximum luminance in the segment area that is still insufficient in luminance after being subjected to the light source lighting amount correction by the lighting amount corrector 22d, the adjacent light source lighting amount corrector 22e increases the luminance set for the segment area adjacent to the subsegment area exhibiting the maximum luminance. If a plurality of such segment areas are adjacent to the subsegment area, the adjacent light source lighting amount corrector 22e determines segment areas to be increased in luminance according to a predetermined order of priority. The information indicating the order of priority is included in, for example, the reference data 22f.

FIG. 18 is a diagram illustrating an example of a correspondence relation between the segment area where the luminance is insufficient, the subsegment area exhibiting the maximum luminance in the segment area, and the segment areas corresponding to the positions of the light sources to be subjected to the adjacent light source lighting amount correction for increasing the lighting amounts in order to supplement the insufficient luminance, and the execution order of the light source lighting amount correction. In FIG. 18 and FIG. 24 to be described later, parenthesized numbers ((1), (2), and (3)) indicate the order of priority of the segment areas corresponding to the light sources to be subjected to the adjacent light source lighting amount correction.

In the present embodiment, the adjacent light source lighting amount corrector 22e selects, from among the light sources 51 corresponding to segment areas adjacent to the subsegment area exhibiting the maximum luminance in the segment area that is still insufficient in luminance after being subjected to the light source lighting amount correction, the light source 51 corresponding to a segment area (1) adjacent to the subsegment area exhibiting the maximum luminance in the X-direction as a light source to be subjected to the adjacent light source lighting amount correction with the highest priority. The adjacent light source lighting amount corrector 22e determines whether the insufficiency in luminance remaining after the light source lighting amount correction has been performed by the lighting amount corrector 22d can be supplemented if the lighting amount of the light source 51 corresponding to the segment area (1) is corrected within the upper limit of the second upper limit luminance (LIMIT). Specifically, the adjacent light source lighting amount corrector 22e calculates, for example, a luminance distribution that can be obtained by correcting the lighting amount of the light source 51 corresponding to this segment area (1) to a lighting amount equal to or lower than the second upper limit luminance (LIMIT), in the same manner as that used by the temporary lighting amount luminance distribution calculator 22c to calculate the temporary lighting amount luminance distribution. The adjacent light source lighting amount corrector 22e determines whether the required luminance of the segment area where the luminance is insufficient can be obtained by using the calculated luminance distribution. If the required luminance of the segment area is determined to be obtainable, the adjacent light source lighting amount corrector 22e corrects the lighting amount of the light source 51 corresponding to this segment area (1) to the lowest lighting amount with which the required luminance of the segment area where the luminance is insufficient can be obtained. If the required luminance of this segment is determined to be not obtainable, the adjacent light source lighting amount corrector 22e sets the lighting amount of the light source 51 corresponding to this segment area (1) to the second upper limit luminance (LIMIT), and selects, from among the light sources 51 corresponding to segment areas adjacent to the subsegment area exhibiting the maximum luminance in the segment area that is still insufficient in luminance after being subjected to the light source lighting amount correction, the light source 51 corresponding to a segment area (2) adjacent thereto in the Y-direction as a light source to be subjected to the adjacent light source lighting amount correction with the next priority. The adjacent light source lighting amount corrector 22e determines whether the insufficiency in luminance remaining after the light source lighting amount correction has been performed by the lighting amount corrector 22d can be supplemented if the lighting amount of the light source 51 corresponding to the segment area (2) is corrected within the upper limit of the second upper limit luminance (LIMIT). If the insufficiency in luminance is determined to be supplementable, the adjacent light source lighting amount corrector 22e performs the same processing as that of the segment area (1) described above. If the insufficiency in luminance is determined to be not supplementable, the adjacent light source lighting amount corrector 22e sets the lighting amount of the light source 51 corresponding to this segment area (2) to the second upper limit luminance (LIMIT), and selects, from among the light sources 51 corresponding to segment areas adjacent to the subsegment area exhibiting the maximum luminance in the segment area that is still insufficient in luminance after being subjected to the light source lighting amount correction, the light source 51 corresponding to a segment area (3) adjacent thereto in an oblique direction as a light source to be subjected to the adjacent light source lighting amount correction with the next priority. Subsequently, the adjacent light source lighting amount corrector 22e performs the same processing as in the cases of the segment areas (1) and (2) on the segment area (3).

FIG. 18 and FIG. 24 to be described later illustrate the priority numbers (1) to (3) indicating the priority order of the segment areas to be subjected to the adjacent light source lighting amount correction. However, priority numbers (4) and more may be set in advance. In this case, if the insufficiency in luminance is still not supplementable after the segment area (3) is subjected to the adjacent light source lighting amount correction, the same processing as that of (1) to (3) may be performed on segment areas (4) and later.

Figures 19, 20:
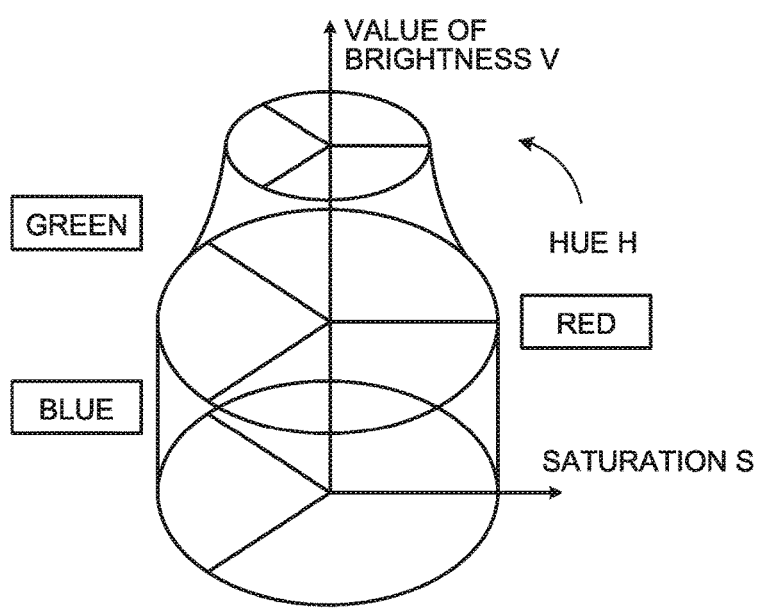
FIG. 19 is a schematic diagram illustrating an example of the luminance of the segment areas after being subjected to the adjacent light source lighting amount correction.
FIG. 20 is a conceptual diagram of an extended HSV color space reproducible by the display device of the embodiment.

FIG. 19 is a schematic diagram illustrating an example of the luminance of the segment areas after being subjected to the adjacent light source lighting amount correction. In the example illustrated in FIG. 19, the luminance of the segment area of [h=3], [v=1] is increased from 100 [%] to 125 [%] by the light source lighting amount correction performed by the lighting amount corrector 22d, where 125 [%] corresponds to the second upper limit luminance (LIMIT). In the description with reference to FIG. 7, the adjacent light source lighting amount corrector 22e performs the adjacent light source lighting amount correction on the segment area of [h=2], [v=1]. The segment area of [h=2], [v=1] corresponds to the segment area (1) adjacent in the X-direction to a subsegment area with the required luminance of the maximum luminance among subsegment areas in the segment area of [h=3], [v=1]. In this case, the subsegment area with the required luminance of the maximum luminance in the segment area of [h=3], [v=1] is upper left side subsegment area adjacent to the segment area of [h=2], [v=0]. In FIG. 19, the luminance of the segment area of [h=2], [v=1] is increased from 50 [%] after being reset to 60 [%] by this adjacent light source lighting amount correction. The luminance of the segment area subjected to the adjacent light source lighting amount correction is a mere example, and is not limited thereto. For example, the luminance after being reset may be 125/2=62.5 [%].

If the adjacent light source lighting amount corrector 22e has performed the adjacent light source lighting amount correction, the lighting amount calculator 22 outputs the light source drive signal BL for lighting up the light sources 51 at lighting amounts corresponding to the luminance after being corrected by the adjacent light source lighting amount corrector 22e. In this manner, the signal processor 20 having the function as the lighting amount calculator 22 serves as the controller that outputs the light source drive signal BL on the basis of the image signal.

The lighting amount corrector 22d may set the representative point not only in the subsegment area with the required luminance of the maximum luminance, but also in each of all the subsegment areas, and may perform the same light source lighting amount correction as that described above on all subsegment areas in one segment area. In this case, the adjacent light source lighting amount corrector 22e supplements the insufficiency in luminance as a result of the correction performed by the lighting amount corrector 22d on all the subsegment areas in one segment area.

FIG. 18 illustrates the execution order of the light source lighting amount correction in the case where the representative point is set not only in the subsegment area with the required luminance of the maximum luminance, but also in each of all the subsegment areas, and where the same processing as that described above is performed on all subsegment areas in one segment area. In the present embodiment, the execution order of the light source lighting amount correction in the case of setting the representative points in all the subsegment areas is determined in advance. Specifically, the lighting amount corrector 22d defines in advance a variable (z) for managing the calculation order to be a certain initial value (such as zero), and performs the light source lighting amount correction using the representative points that have been set. After the light source lighting amount correction using one representative point is completed, the lighting amount corrector 22d increments the variable (z) by one, and performs the light source lighting amount correction using a representative point in a subsegment area corresponding to the value set as the variable. The repetition of the increment of the variable (z) and the light source lighting amount correction ends when the light source lighting amount correction is completed after the value of the variable (z) has reached a certain final value (such as three). In FIG. 18, of four subsegment areas included in one segment area, a subsegment area (such as the subsegment area at the upper left) adjacent to a segment area having smaller numbers for the XY-coordinates is a subsegment area corresponding to z=0. Of the other three subsegment areas, a subsegment area (such as the subsegment area at the upper right) adjacent to a segment area having a smaller number for the Y-coordinate is a subsegment area corresponding to z=1. Of the two remaining subsegment areas, one subsegment area (such as the subsegment area at the lower left) adjacent to a segment area having a smaller number for the X-coordinate is a subsegment area corresponding to z=2, and the other subsegment area (such as the subsegment area at the lower right) is a subsegment area corresponding to z=3.

The luminance distribution calculator 23 calculates the luminance distribution of the entire light source device 50 caused by the lighting amounts of the light sources 51 indicated by the light source drive signal BL. Specifically, the luminance distribution calculator 23 obtains the luminance distribution using, for example, the same data as the reference data stored in advance in a storage device included in the luminance distribution calculator 23 or an algorithm already implemented in the luminance distribution calculator 23. The luminance distribution calculator 23 may be configured to be capable of referring to the reference data 22f of the lighting amount calculator 22. The reference data 22f may be provided so as to be referable from all the functions included in the signal processor 20. The luminance distribution calculator 23 outputs luminance distribution information BM indicating the luminance distribution to the pixel processor 24.

The pixel processor 24 obtains the gradation value of each of the pixels 48 for performing the display output on the basis of the unprocessed signal BD with the luminance distribution indicated by the luminance distribution information BM. Specifically, for example, in a segment area for which the luminance has been reset by the temporary lighting amount resetter 22b, the light from the light source device 50 is more intense than the luminance before being reset by the block required luminance calculator 21. As a result, the pixel 48 is sometimes made brighter than necessary if the transmittance of the pixel 48 is controlled while maintaining the gradation value indicated by the processed signal AD. Thus, the pixel processor 24 corrects the gradation value of each of the sub-pixels 49 constituting the pixels 48 included in the segment area that has been reset in luminance. As an example, the luminance (30 [%]) of the segment area of [h=3], [v=0] has been reset to the reset luminance (50 [%]). The pixel processor 24 corrects the gradation value of each of the sub-pixels 49 constituting the pixels 48 included in the segment area of [h=3], [v=0] according to a ratio of luminance between before and after the reset. For example, assume that the processed signal AD includes information indicating that the gradation value of the pixels 48 included in the segment area of [h=3], [v=0] is (R, G, B)=(50, 100, 150). In this case, the pixel processor 24 corrects the gradation value of (R, G, B)=(50, 100, 150) by multiplying it by the reciprocal (3/5) of the magnification ratio (5/3) of the luminance after the reset (50 [%]) to the luminance before the reset (30 [%]). As a result, in this case, the pixel processor 24 corrects the gradation value of (R, G, B)=(50, 100, 150) to (R, G, B)=(30, 60, 90).

Since the unprocessed signal BD is an RGB signal, and the processed signal AD is an RGBW signal, the pixel processor 24 also performs processing to convert the RGB signal into the RGBW signal. Specifically, an output corresponding to the gradation value of (R, G, B)=(30, 60, 90) can be replaced with (R, G, B, W)=(0, 30, 60, 30) by assigning an output corresponding to components (R, G, B)=(30, 30, 30) to a white color component (W). The pixel processor 24 also performs processing to assign such an output assignable to the white color component (W) to the fourth sub-pixel 49W included in the pixel 48.

FIG. 20 is a conceptual diagram of an extended HSV color space reproducible by the display device of the embodiment. In the present embodiment, since the pixel 48 includes the fourth sub-pixel 49W, a color space extended from a color space of the unprocessed signal BD can be employed to obtain the processed signal AD. As illustrated in FIG. 20, the extended HSV color space with the fourth color has a shape obtained by placing a color space having a substantially truncated cone shape on a cylindrical HSV color space. In the color space having a substantially truncated cone shape, the maximum value of a value (also called brightness) V is reduced as saturation S increases. The cylindrical HSV color space is a color space that can be displayed by the first sub-pixel 49R, the second sub-pixel 49G, and the third sub-pixel 49B. The signal processor 20 includes a storage device storing a maximum value Vmax(S) of the brightness using the saturation S as a variable in the extended HSV color space extended by addition of the fourth color. That is, the signal processor 20 stores the maximum value Vmax(S) of the brightness for each pair of coordinates (coordinate values) of the saturation S and hue H regarding the three-dimensional shape of the extended HSV color space illustrated in FIG. 20.

An image signal SRGB is a signal having an image signal value corresponding to the first, second, and third primary colors. Consequently, the extended HSV color space of the image signal SRGB has a cylindrical shape, that is, the same shape as a cylindrical part of the extended HSV color space illustrated in FIG. 20. Accordingly, a display signal SRGBW can be calculated as an extended image signal obtained by extending the image signal SRGB for the extended HSV color space. The extended image signal is extended by an extension coefficient α determined by comparing the brightness level in the extended HSV color space. Extending the signal level of the image signal by the extension coefficient α allows the value of the fourth sub-pixel 49W to be larger, and thus can increase the luminance of the entire image. At this time, the image can be displayed at exactly the same luminance as that of the image signal SRGB by reducing the luminance of the light source device 50 by a factor of 1/α to counterbalance the increase in luminance of the entire image by the extension coefficient α. For example, the block required luminance calculator 21 calculates, as the required luminance, the extension coefficient α and the luminance of the light source device 50 reduced by the factor of 1/α according to the extension coefficient α. That is, the luminance indicated by the temporary setting information BB may be the required luminance of a segment area corresponding to the luminance of the light source device 50 reduced by the factor of 1/α according to the extension coefficient α. For example, the pixel processor 24 performs the processing to obtain the gradation value of the sub-pixel 49.

The following describes the extension of the image signal SRGB. In the signal processor 20, letting χ denote a constant depending on the display device 10, $X1_{(p,q)}$ serving as a display signal of the first sub-pixel 49R, $X2_{(p,q)}$ serving as a display signal of the second sub-pixel 49G, and $X3_{(p,q)}$ serving as a display signal of the third sub-pixel 49B transmitted to a (p,q)th pixel (or a set of the first, second, and third sub-pixels 49R, 49G, and 49B) can be expressed as follows using the extension coefficient α and the constant χ, where χ will be described later.

$$X1_{(p,q)} = \alpha \cdot x1_{(p,q)} - \chi \cdot X4_{(p,q)} \tag{1}$$

$$X2_{(p,q)} = \alpha \cdot x2_{(p,q)} - \chi \cdot X4_{(p,q)} \tag{2}$$

$$X3_{(p,q)} = \alpha \cdot x3_{(p,q)} - \chi \cdot X4_{(p,q)} \tag{3}$$

A display signal value $X4_{(p,q)}$ can be obtained on the basis of the product of $Min_{(p,q)}$ and the extension coefficient α. $Min_{(p,q)}$ is the minimum value of the image signal values $x1_{(p,q)}$, $x2_{(p,q)}$, and $x3_{(p,q)}$. Specifically, the display signal value $X4_{(p,q)}$ can be obtained on the basis of Expression (4) below. In Expression (4), the product of $Min_{(p,q)}$ and the extension coefficient α is divided by χ. The present invention is, however, not limited thereto. The extension coefficient α is determined for each image display frame.

$$X4_{(p,q)} = Min_{(p,q)} \cdot \alpha / \chi \tag{4}$$

In general, in the (p,q)th pixel, the saturation $S_{(p,q)}$ and the brightness $V(S)_{(p,q)}$ in the cylindrical HSV color space can be obtained from Expressions (5) and (6) below on the basis of the image signal SRGB including the image signal value $x1_{(p,q)}$ for the first primary color, the image signal value $x2_{(p,q)}$ for the second primary color, and the image signal value $x3_{(p,q)}$ for the third primary color.

$$S_{(p,q)} = (Max_{(p,q)} - Min_{(p,q)}) / Max_{(p,q)} \tag{5}$$

$$V(S)_{(p,q)} = Max_{(p,q)} \tag{6}$$

$Max_{(p,q)}$ is the maximum value of the image signal values $x1_{(p,q)}$, $x2_{(p,q)}$, and $x3_{(p,q)}$ of the image signal SRGB. $Min_{(p,q)}$ is the minimum value of input values of the three sub-pixels. The saturation S can be a value ranging from 0 to 1, and the brightness V(S) can be a value ranging from 0 to $(2^n-1)$, where n is the number of display gradation bits.

The fourth sub-pixel 49W for displaying the fourth color is brighter than the first sub-pixel 49R for displaying the first primary color, the second sub-pixel 49G for displaying the second primary color, and the third sub-pixel 49B for displaying the third primary color when irradiated with the same lighting amount. Assume that, when a signal having a value corresponding to the maximum signal value of the display signal of the first sub-pixel 49R is supplied to the first sub-pixel 49R, a signal having a value corresponding to the maximum signal value of the display signal of the second sub-pixel 49G is supplied to the second sub-pixel 49G, and a signal having a value corresponding to the maximum signal value of the display signal of the third sub-pixel 49B is supplied to the third sub-pixel 49B, then the luminance of an aggregate of the first, second, and third sub-pixels 49R, 49G, and 49B included in the pixel 48 or a group of pixels 48 is $BN_{1-3}$. Assume also that, when a signal having a value corresponding to the maximum signal value of the display signal of the fourth sub-pixel 49W is supplied to the fourth sub-pixel 49W included in the pixel 48 or a group of pixels 48, the luminance of the fourth sub-pixel 49W is $BN_4$. That is, the aggregate of the first, second, and third sub-pixels 49R, 49G, and 49B displays white at the maximum luminance, and the luminance of the white is represented by $BN_{1-3}$. Then, the constant χ depending on the display device 10 is represented as $\chi = BN_4/BN_{1-3}$.

When the display signal value $X4_{(p,q)}$ is given by Expression (4) above, the maximum value Vmax(S) of the brightness using the saturation S as the variable in the extended HSV color space can be represented by Expressions (7) and (8) below. Expression (7) represents a case where $S \leq S_0$. Expression (8) represents a case where $S_0 < S \leq 1$. In Expression (8), $S_0 = 1/(\chi+1)$.

$$Vmax(S) = (\chi+1) \cdot (2^n-1) \tag{7}$$

$$Vmax(S) = (2^n-1) \cdot (1/S) \tag{8}$$

The thus obtained maximum value Vmax(S) of the brightness using the saturation S as a variable in the extended HSV color space extended by adding the fourth color is stored in the signal processor 20 as a kind of look-up table, for example. Alternatively, the signal processor 20 determines the maximum value Vmax(S) of the brightness using the saturation S as a variable in the extended HSV color space as occasion demands. The extension coefficient α is a coefficient for extending the brightness V(S) in the HSV color space to that in the extended HSV color space, and can be represented by Expression (9) below.

$$\alpha(S)=V\max(S)/V(S) \qquad (9)$$

In the extension calculation, the extension coefficient α is determined, for example, on the basis of α(S) obtained for the pixels 48. The extension calculation is performed so as to keep a ratio between the luminance of the first primary color displayed by (first sub-pixel 49R+fourth sub-pixel 49W), the luminance of the second primary color displayed by (second sub-pixel 49G+fourth sub-pixel 49W), and the luminance of the third primary color displayed by (third sub-pixel 49B+fourth sub-pixel 49W). The calculation is performed so as to also keep (maintain) color tone. Furthermore, the calculation is performed so as to keep (maintain) a gradation-luminance characteristic (gamma (γ) characteristic). If all the image signal values for any one of the pixels 48 or any group of the pixels 48 are zero or small, the extension coefficient α may be calculated without including such a pixel 48 or such a group of pixels 48.

The signal processor 20 may, for example, calculate the extension coefficient α for each pixel and determine the extension coefficient α for any area on the basis of at least one of the extension coefficients α calculated for pixels in the area, or may determine the extension coefficient α for any area on the basis of at least one of the extension coefficients α of sampled pixels. The area may be one pixel or the entire display surface, or may be, for example, a segment area. Expressions (1), (2), (3), and (4) are used to convert the image signal SRGB into the display signal SRGBW.

In this manner, the luminance of the light source device 50 can be set to the lowest value at which colors can be reproduced in the extended HSV color space of the display device 10 by controlling the division driving of the light source device 50 and controlling the image display to the image display panel 30 using the extension coefficient α. Due to this, power consumption of the display device 10 can be reduced.

Figure 21:
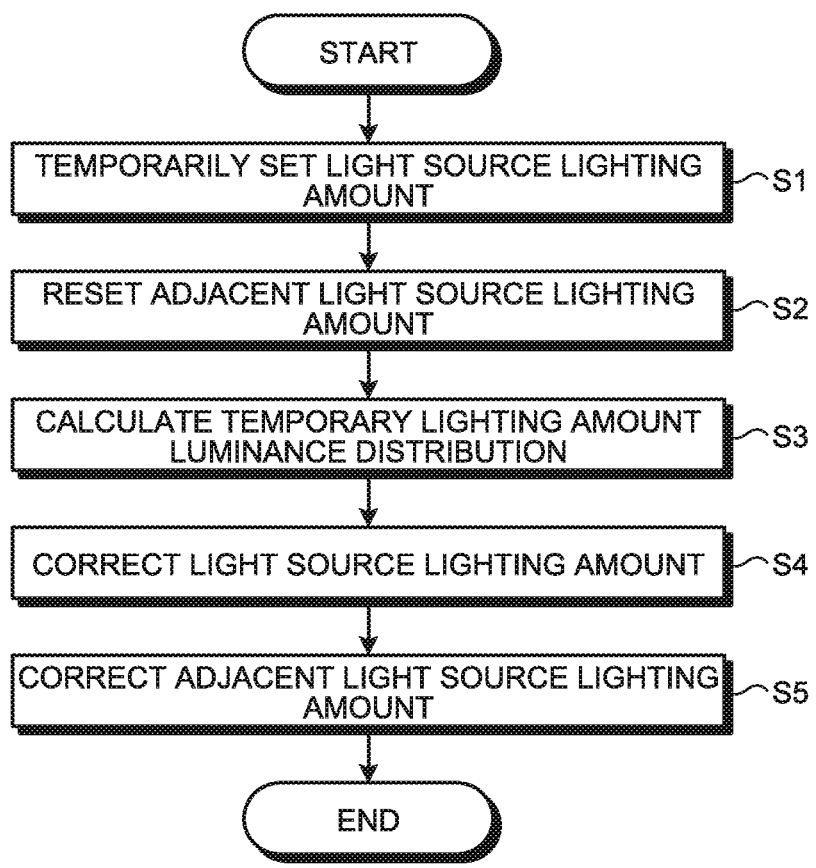
FIG. 21 is an exemplary flowchart of processing to obtain a light source drive signal.

FIG. 21 is an exemplary flowchart of processing to obtain the light source drive signal BL. First, based on the image signal for each of the subsegment areas obtained by dividing the segment area into a plurality of parts, the temporary lighting amount setter 22a calculates the required luminance of each of the subsegment areas. Subsequently, the temporary lighting amount setter 22a temporarily sets the luminance of each of the segment areas for determining the lighting amounts of a plurality of light sources on the basis of the maximum luminance among the required luminance values of the respective subsegment areas included in each of the segment areas. Thus, the temporary lighting amount setter 22a temporarily sets the luminance of the segment area as the light source lighting amount temporary setting (Step S1). Then, if the reset luminance calculated by multiplying the luminance required for the subsegment area by the predetermined coefficient is higher than the luminance of a segment area adjacent to the subsegment area, the temporary lighting amount resetter 22b resets the luminance of the segment area to the reset luminance. Thus, the temporary lighting amount resetter 22b resets the luminance of the segment area as the adjacent light source lighting amount reset (Step S2). Then, the temporary lighting amount luminance distribution calculator 22c calculates the temporary lighting amount luminance distribution corresponding to the lighting amounts in which the luminance after being reset by the temporary lighting amount resetter 22b is reflected (Step S3).

Then, as needed, the lighting amount corrector 22d performs the correction of the lighting amounts of the light sources 51 (light source lighting amount correction) for obtaining the required luminance on the basis of the difference between the required luminance and the temporary lighting amount luminance distribution (Step S4). The adjacent light source lighting amount corrector 22e performs the adjacent light source lighting amount correction according to the reference information received from the lighting amount corrector 22d (Step S5).

Figure 22:
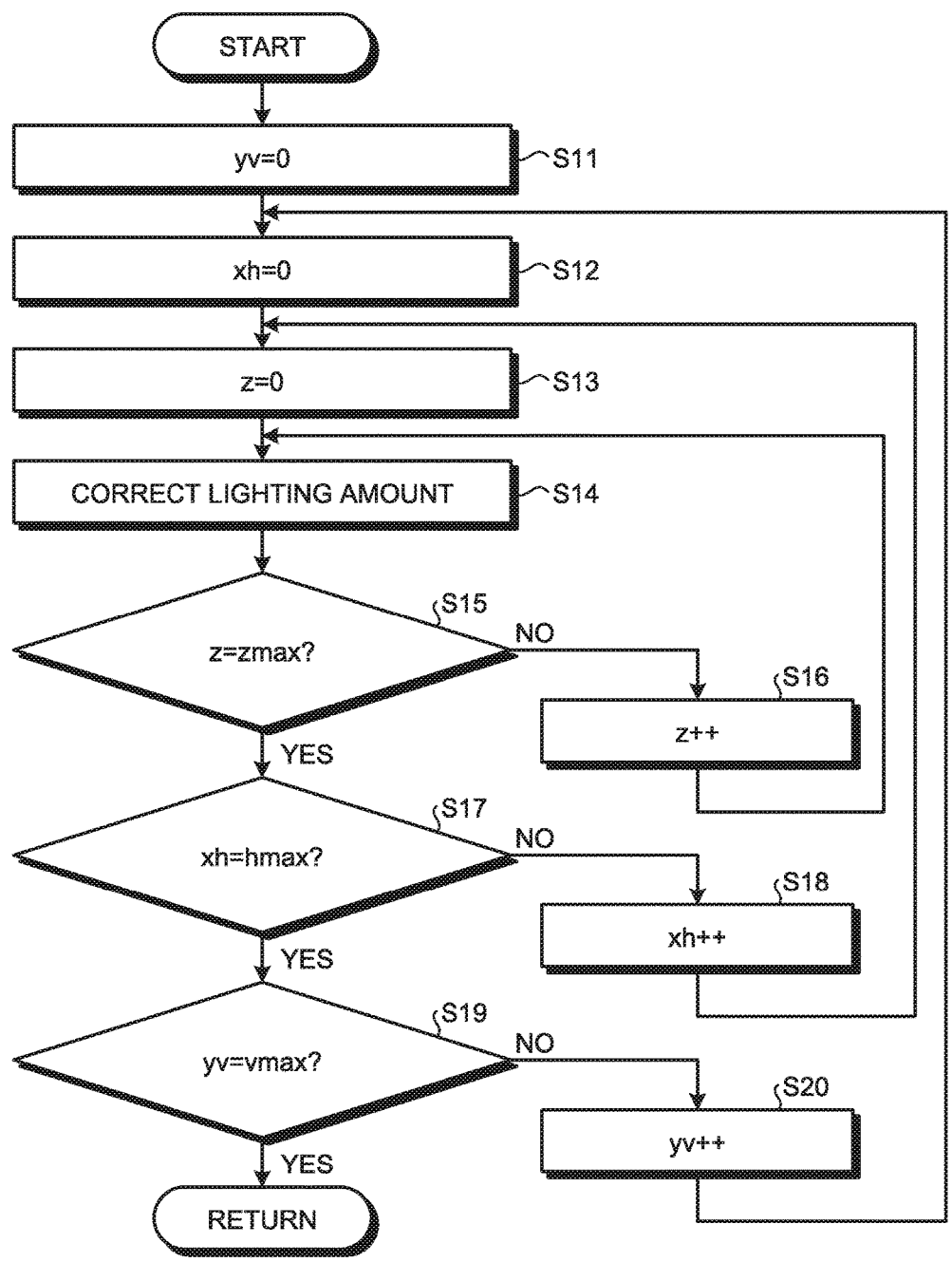
FIG. 22 is an exemplary flowchart of calculation processing of the light source lighting amount correction illustrated in FIG. 21.

FIG. 22 is an exemplary flowchart of calculation processing of the light source lighting amount correction illustrated in FIG. 21. FIG. 22 illustrates an exemplary execution routine of the light source lighting amount correction performed on one segment area in the case where the representative point is set not only for the subsegment area with the required luminance of the maximum luminance, but also for each of all the subsegment areas, and where the same light source lighting amount correction as that described above is performed on all subsegment areas in the segment area. The lighting amount corrector 22d sets a variable (yv) for managing the Y-coordinate of the segment area to a certain initial value (for example, yv=0) (Step S11). The lighting amount corrector 22d sets a variable (xh) for managing the X-coordinate of the segment area to a certain initial value (for example, xh=0) (Step S12). The lighting amount corrector 22d sets the variable (z) for managing the execution order of the light source lighting amount correction based on the required luminance values of the subsegment areas to a certain initial value (for example, z=0) (Step S13). Each of the variable (yv), the variable (xh), and the variable (z) is a variable for setting a value of a counter used in the calculation processing of the light source lighting amount correction performed by the lighting amount corrector 22d. Each of the variable (yv), the variable (xh), and the variable (z) may be a variable managed by using a counter controlled by a logic circuit mounted on the lighting amount corrector 22d, or by a software program. The lighting amount corrector 22d sets a representative point for a subsegment area corresponding to the variable (z) among the subsegment areas included in the segment area corresponding to the variables [h=(xh)], [v=(yv)] of the XY-coordinates, and corrects the lighting amount of the light source 51 using the representative point (Step S14).

After Step S14 is completed, the lighting amount corrector 22d determines whether the value of the variable (z) is equal to a maximum value (zmax) of the variable for managing the execution order of the light source lighting amount correction (Step S15). In the case of the example illustrated in FIG. 18, zmax=3. If the value of the variable (z) is not equal to the maximum value (zmax) (No at Step S15), the lighting amount corrector 22d increments the value of the variable (z) by one (Step S16), and performs the processing at Step S14.

If the value of the variable (z) is equal to the maximum value (zmax) (Yes at Step S15), the lighting amount corrector 22d determines whether the value of the variable (xh) is equal to a maximum value (hmax) of the variable for managing the X-coordinate of the segment area (Step S17). In the case of the example illustrated in FIG. 14, hmax=6. If the value of the variable (xh) is not equal to the maximum value (hmax) (No at Step S17), the lighting amount corrector 22d increments the value of the variable (xh) by one (Step S18), and performs the processing at Step S13.

If the value of the variable (xh) is equal to the maximum value (hmax) (Yes at Step S17), the lighting amount corrector 22d determines whether the value of the variable (yv) is equal to a maximum value (vmax) of the variable for managing the Y-coordinate of the segment area (Step S19). In the case of the example illustrated in FIG. 14, vmax=3. If the value of the variable (yv) is not equal to the maximum value (vmax) (No at Step S19), the lighting amount corrector 22d increments the value of the variable (yv) by one (Step S20), and performs the processing at Step S12. If the value of the variable (yv) is equal to the maximum value (vmax) (Yes at Step S19), the light source lighting amount correction, that is, the processing at Step S4 ends.

As described above, according to the first embodiment, at least the luminance of the segment areas adjacent to the subsegment area with the required luminance of the maximum luminance is reset. Hence, the segment areas to be reset can be changed with the change in the display output image, and light sources to be corrected for increasing the luminance can be easily dispersed. As a result, the load on the light sources can be further reduced. In the case where the high luminance output in the subsegment area with the required luminance of the maximum luminance shifts toward a segment area adjacent to this subsegment area, the amount of the change in luminance on a per segment area basis can be reduced, and the display quality is more easily restrained from deteriorating due to the sudden large change in luminance. As a result, the display output can be performed with higher display quality.

Based on the luminance of a segment area after being reset and at least the maximum luminance among the luminance values required for the respective subsegment areas included in the segment area, the lighting amount of the light source illuminating the segment area is corrected within the range equal to or lower than the predetermined second upper limit luminance. Due to this, a light quantity required for the display output can be obtained in a more reliable manner.

If the reset luminance calculated by multiplying the luminance required for the subsegment area by the predetermined coefficient is higher than the luminance of a segment area adjacent to the subsegment area, the luminance of the segment area is reset to reset luminance. Due to this, the difference between the luminance of the subsegment area and the luminance of the segment area adjacent to the subsegment area can be easily reduced. Consequently, in the case where the high luminance output in the subsegment area with the required luminance of the maximum luminance shifts toward the segment area adjacent to this subsegment area, the amount of the change in luminance on a per segment area basis can be reduced, and the display quality is more easily restrained from deteriorating due to the sudden large change in luminance. As a result, the display output can be performed with higher display quality.

The segment areas are arranged along at least one direction (for example, along two directions of the X-direction and the Y-direction). The two dividing lines for dividing the segment area into the subsegment areas extend along at least this one direction (for example, along two directions of the X-direction and the Y-direction). Due to this, the parallel arrangement direction of the segment areas and the parallel arrangement direction of the subsegment areas can correspond to each other, and regularity about the resetting of the luminance can be more easily ensured. In the light source device 50 the light sources are arranged along at least one direction (for example, along two directions of the X-direction and the Y-direction). Due to this, the luminance of the segment areas and the lighting amounts of the light sources 51 can more easily correspond to each other, and the scheme of control of the light sources 51 according to the resetting of the luminance can be made simpler.

2. Second Embodiment

The following describes a second embodiment of the present invention different from the first embodiment. In the description of the second embodiment, the same reference numerals will be assigned to the same configurations as those of the first embodiment in some cases. For configurations not particularly mentioned in the description of the second embodiment, the same configurations as those of the first embodiment can be employed.

Figure 23:
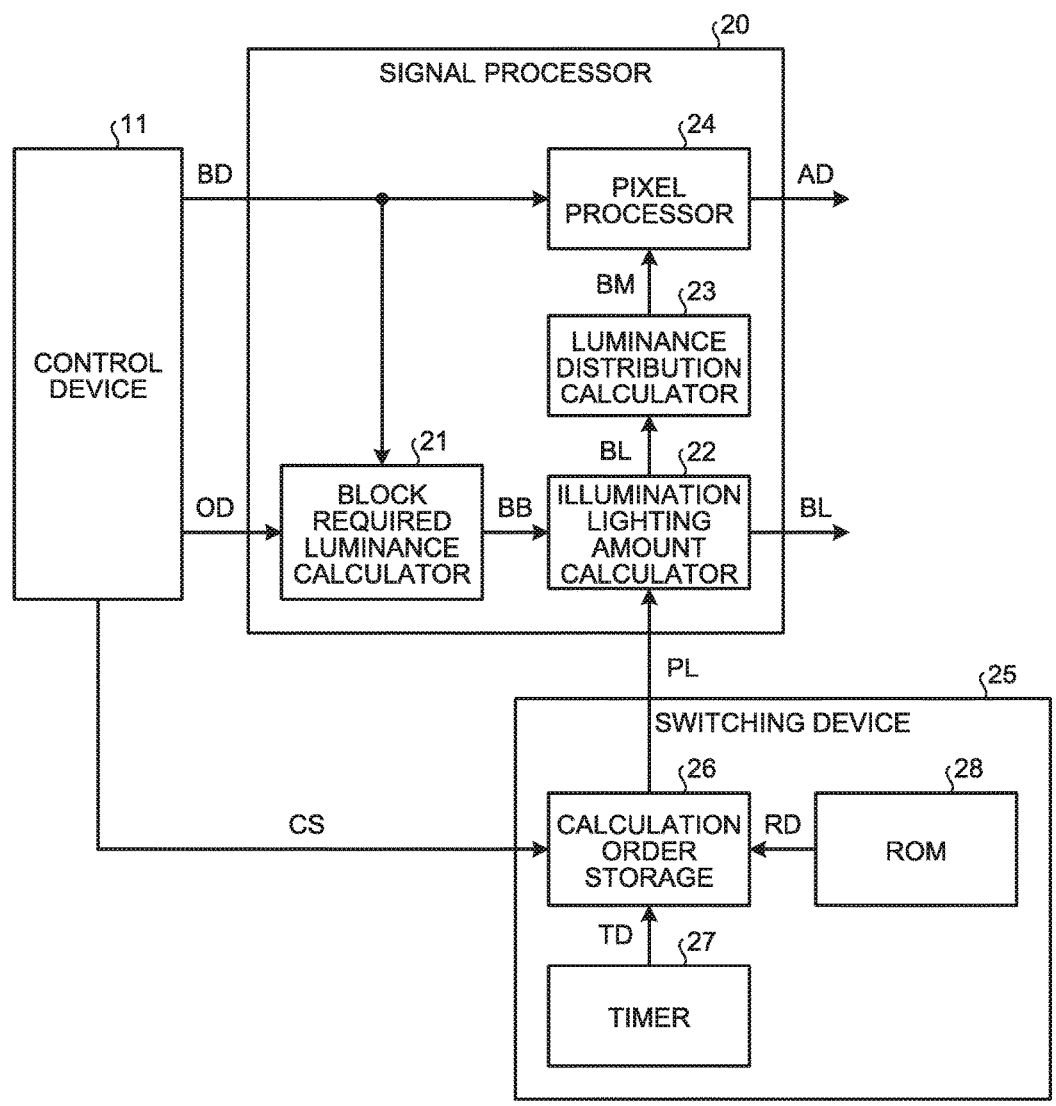
FIG. 23 is a block diagram illustrating an exemplary configuration of a display device according to a second embodiment of the present invention.

FIG. 23 is a block diagram illustrating an exemplary configuration of a display device according to the second embodiment. The display device of the second embodiment further includes a switching device 25 in addition to the configuration of the display device of the first embodiment. The switching device 25 is a circuit for switching among multiple patterns of the execution order of the light source lighting amount correction performed by the lighting amount corrector 22d. Specifically, the switching device 25 includes, for example, calculation order storage 26, a timer 27, and a read-only memory (ROM) 28.

The calculation order storage 26 stores the execution order of the light source lighting amount correction to be employed by the lighting amount corrector 22d. Specifically, in the second embodiment, a plurality (such as two patterns) of such execution order of the light source lighting amount correction are provided. The ROM 28 keeps the patterns of execution orders. The calculation order storage 26 reads from the ROM 28 and stores a pattern of execution order of the light source lighting amount correction to be currently employed by the lighting amount corrector 22d among the patterns of execution orders.

FIG. 24 is a diagram illustrating another example of the correspondence relation between the segment area where the luminance is insufficient, the subsegment area exhibiting the maximum luminance in the segment area, and the segment areas corresponding to the positions of the light sources 51 to be subjected to the adjacent light source lighting amount correction for increasing the lighting amounts in order to supplement the insufficient luminance, and the execution order of the light source lighting amount correction. In the second embodiment, the ROM 28 stores the execution order of the light source lighting amount correction described with reference to FIG. 18 as one pattern. In the second embodiment, the ROM 28 stores the execution order of the light source lighting amount correction described with reference to FIG. 24 as another pattern. In FIG. 24, of four subsegment areas included in one segment area, a subsegment area (such as the subsegment area at the lower right) adjacent to a segment area having larger numbers for the XY-coordinates is a subsegment area corresponding to $z=0$. Of the other three subsegment areas, a subsegment area (such as the subsegment area at the lower left) adjacent to a segment area having a larger number for the Y-coordinate is a subsegment area corresponding to $z=1$. Of the two remaining subsegment areas, one subsegment area (such as the subsegment area at the upper right) adjacent to a segment area having a larger number for the X-coordinate is a subsegment area corresponding to z=2, and the other subsegment area (such as the subsegment area at the upper left) is a subsegment area corresponding to z=3.

Switching the patterns of the execution order may involve switching the orders of priority in which the segment areas are to be subjected to the adjacent light source lighting amount correction, in addition to the execution order of the light source lighting amount correction. Specifically, as illustrated in FIG. 24, if the other pattern is employed, the light source 51 corresponding to a segment area (1) adjacent in the Y-direction to the subsegment area exhibiting the maximum luminance in the segment area that is still insufficient in luminance after being subjected to the light source lighting amount correction may be selected as a light source to be subjected to the adjacent light source lighting amount correction with the highest priority from among the light sources 51 corresponding to segment areas adjacent to the subsegment exhibiting the maximum luminance. The light source 51 corresponding to a segment area (2) adjacent to the subsegment area exhibiting the maximum luminance in the X-direction may be selected as a light source to be subjected to the adjacent light source lighting amount correction with the next priority from among the light sources 51 corresponding to segment areas adjacent to the subsegment area exhibiting the maximum luminance.

The timer 27 counts time to determine time to switch the execution order of the light source lighting amount correction to another pattern. Specifically, the timer 27 outputs a switching timing signal TD to the calculation order storage 26 each time a predetermined time elapses, the switching timing signal TD being a signal for indicating the time to switch the execution order of the light source lighting amount correction to the other pattern.

The control device 11 of the second embodiment outputs a clock signal CS to the switching device 25 at a predetermined period. The calculation order storage 26 checks whether the switching timing signal TD is received in response to input timing of the clock signal CS. If the switching timing signal TD is received, the calculation order storage 26 reads, as an employed pattern RD, a pattern of the execution order of the light source lighting amount correction different from the stored pattern of the execution order of the light source lighting amount correction. The calculation order storage 26 outputs a command signal PL for making the lighting amount corrector 22d employ the employed pattern RD to the lighting amount calculator 22.

If three or more patterns of the execution order of the light source lighting amount correction are provided, the calculation order storage 26 keeps data indicating the order of employment of the three or more patterns of the execution order, selects and reads from the ROM 28 the execution order of the light source lighting amount correction in the order of employment according to the data, and outputs the command signal PL.

While the switching device 25 is provided as an independent configuration in FIG. 23, the function of the switching device 25 may be a function included in another configuration. For example, the signal processor 20 may have the same function as that of the switching device 25.

What is changed by the change in the execution order of the light source lighting amount correction due to the switching of the pattern is not limited to the execution order of the light source lighting amount correction on a per subsegment area basis using the representative point (steps related to z in the flowchart of FIG. 22). For example, the content of manipulation of the initial values of xh and yv and the values of xh and yv, which has been described with reference to the flowchart of FIG. 22, may be changed according to the switching of the pattern. Specifically, if the other pattern is employed, the initial values of xh and yv may be set to the maximum values (hmax and vmax), and xh and yv may be decremented by one until xh and yv reach the minimum value (0). This change can change (for example, reverse) the processing target shifting order of the segment areas subjected to the light source lighting amount correction according to the pattern, in the same manner as the processing target shifting order of the subsegment areas in one pattern and the other pattern. Due to this, the light sources to be corrected for increasing the luminance can be easily dispersed. As a result, the load on the light sources can be further reduced. Such a change in the processing target shifting order of the segment areas according to the switching of the pattern can be applied to the execution order of the light source lighting amount correction in the same manner.

3. Modifications

The following describes modifications of the first embodiment and the second embodiment according to the present embodiment. In the description of the modifications, the same reference numerals will be assigned to the same configurations as those of the first embodiment in some cases. The modifications to be described below are applicable to either of the first and second embodiments. For configurations not particularly mentioned in the description of the modifications, the same configurations as those of the first and second embodiments can be employed.

3-1. First Modification

Figures 25, 26:
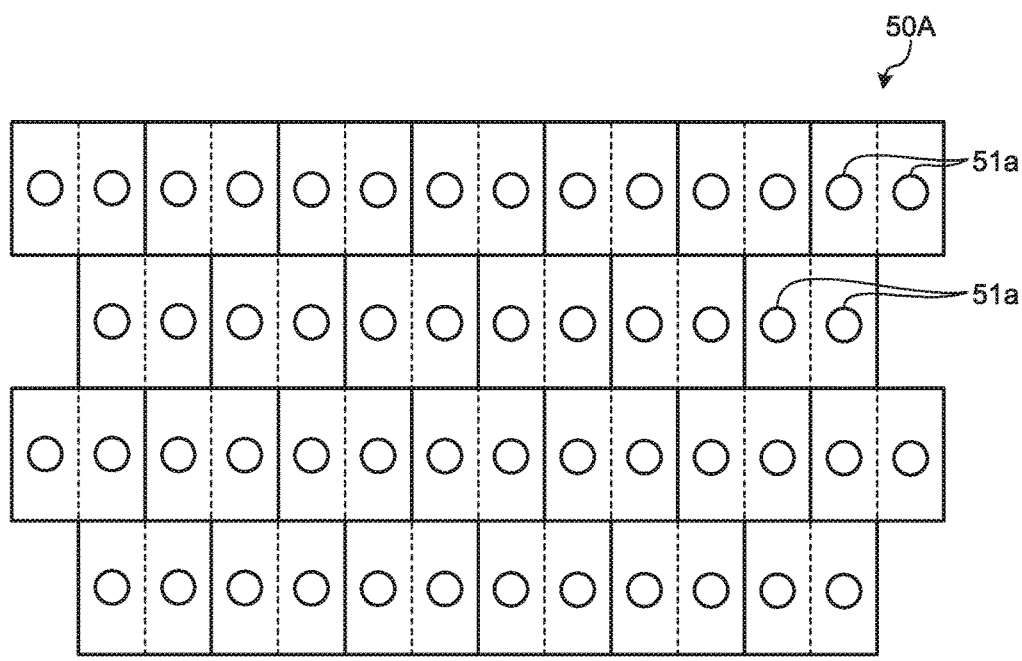
FIG. 25 is a schematic diagram illustrating a setting example of the segment areas and the subsegment areas of the image display panel according to a first modification.
FIG. 26 is a diagram illustrating an arrangement example of light sources of a light source device according to the first modification.

FIG. 25 is a schematic diagram illustrating a setting example of the segment areas and the subsegment areas of the image display panel 30 according to a first modification. As exemplified in a first modification, the segment areas may be arranged along one direction, and the segment areas may be arranged in a staggered manner along another direction orthogonal to one direction. Specifically, as illustrated in FIG. 25, the segment areas may be arranged in the X-direction to form rows of the segment areas and arranged in a staggered manner along the Y-direction to form a zigzag arrangement, for example. In FIG. 25, the configuration of a plurality of subsegment areas included in one subsegment area is the same as that of the first embodiment. Either configuration of the first and second embodiments may be employed for the resetting of the luminance.

FIG. 26 is a diagram illustrating an arrangement example of light sources 51a of a light source device 50A according to the first modification. In the first modification, two light sources may be assigned to one segment area as illustrated, for example, in FIG. 26. In FIG. 26, two light sources 51a are assigned to one segment area and arranged at even intervals along the X-direction, and the light sources 51a included in the light source device 50A are arranged so as to be aligned in the row and column directions. Due to this, the resetting to the reset luminance for the segment area can be performed on a per light source 51a basis. Specifically, if the reset luminance of the segment area adjacent to a subsegment area in the X-direction or the Y-direction, which is calculated using the first coefficient in the first embodiment, is reset for the segment areas, the reset luminance may be reflected in the lighting amount of the light source 51a adjacent along the X-direction or Y-direction to the subsegment area for which the reset luminance is calculated. That is, the reset luminance may be reflected in some of the light sources 51a, instead of all the light sources 51a illuminating the segment areas. Due to this, a difference in luminance on a per subsegment area basis can be more easily reflected by the luminance distribution indicated by the light source drive signal BL with high fidelity.

The display device of the first modification may have a configuration in which the light sources 51 are assigned to the segment areas on a one-to-one basis described with reference to FIG. 3. In this case, the light sources 51 are arranged in a staggered manner in the Y-direction.

3-2. Second Modification

Figures 27, 28:
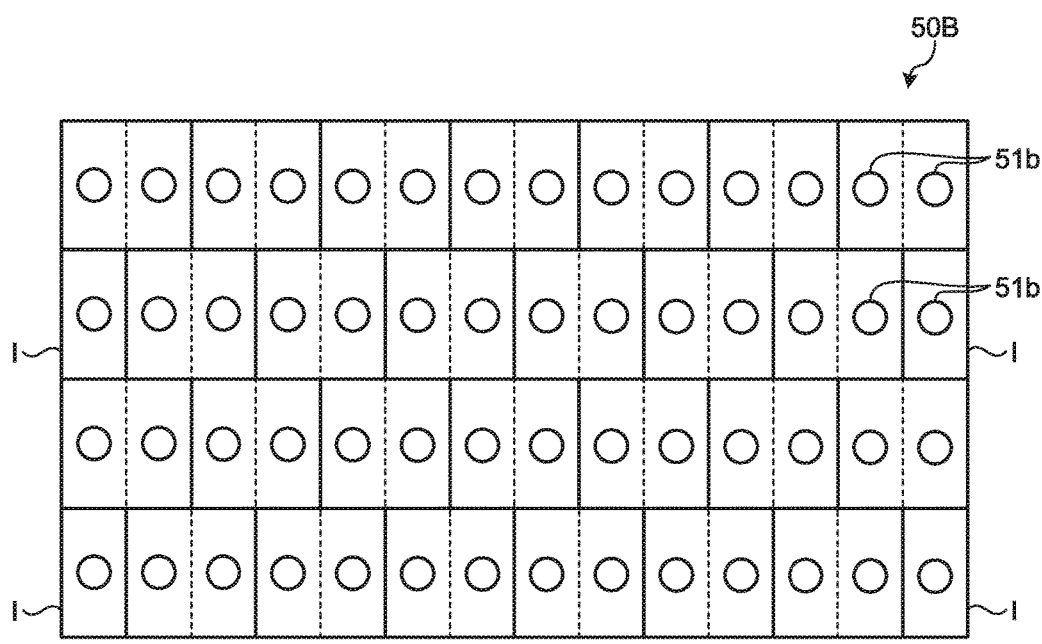
FIG. 27 is a schematic diagram illustrating a setting example of the segment areas and the subsegment areas of the image display panel according to a second modification.
FIG. 28 is a diagram illustrating an arrangement example of light sources of a light source device according to the second modification.

FIG. 27 is a schematic diagram illustrating a setting example of the segment areas and the subsegment areas of the image display panel 30 according to a second modification. FIG. 28 is a diagram illustrating an arrangement example of light sources 51b of a light source device 50B according to the second modification. In the first modification described above, the segment areas are arranged in a staggered manner in the other direction (Y-direction), and hence, both ends in one direction (X-direction) of the display area form gaps on a row-by-row basis. In the second modification, a substantially half segment area H is provided so as to fill each of the gaps. The segment area H is a segment area having one or more subsegment areas the number of which is halved in one direction. The arrangement of the light sources 51b of the light source device 50B corresponds to the segment areas H. In the FIG. 28, a substantially half block I is a block for illuminating the segment area H. The number of light sources 51b arranged in the block I in one direction is half the number of light sources 51b arranged in each of the blocks for illuminating the other segment areas. Either configuration of the first and second embodiments may be employed for the resetting of the luminance.

In the first modification and the second modification, the relation between one direction and the other direction may be reversed. That is, one direction may be the Y-direction, and the other direction may be the X-direction.

3-3. Third Modification

Figure 29:
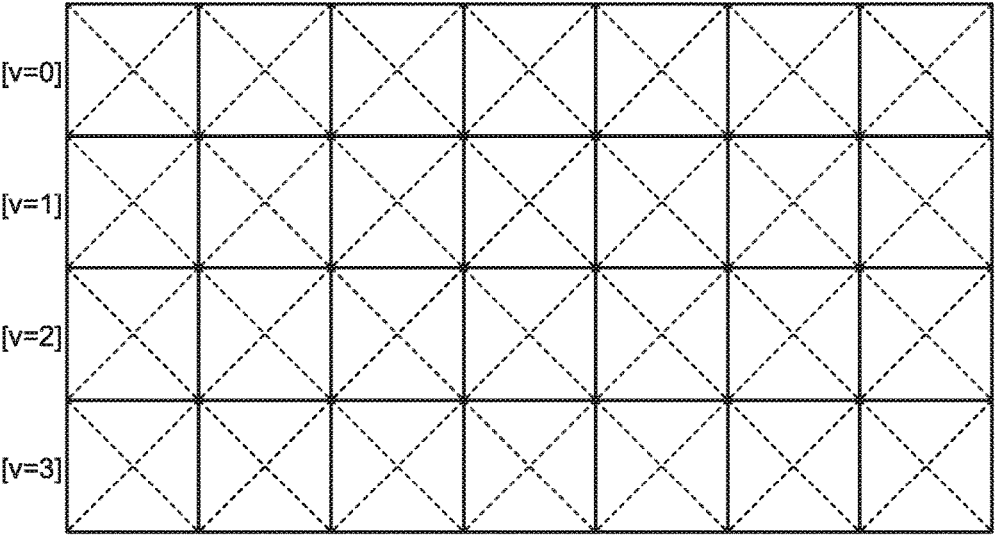
FIG. 29 is a schematic diagram illustrating a setting example of the segment areas and the subsegment areas of the image display panel according to a third modification.

FIG. 29 is a schematic diagram illustrating a setting example of the segment areas and the subsegment areas of the image display panel 30 according to a third modification. In the third modification, the two dividing lines for dividing the segment area into a plurality of subsegment areas do not extend along one direction (such as at least one of the X-direction and the Y-direction) in which the light sources 51 are arranged. That is, as illustrated in FIG. 29, the two dividing lines, which are represented by dotted lines, may extend in oblique directions so as to form the diagonal lines of the rectangle of the segment area. Strictly speaking, the two dividing lines form stepped lines so as to trace border lines between the pixels 48, and these steps extend along the directions of the diagonal lines. Either configuration of the first and second embodiments may be employed for the resetting of the luminance. In this case, in the adjacent light source lighting amount correction, using a light source of a segment area facing a side of the subsegment area has higher priority.

3-4. Fourth Modification

Figure 30:
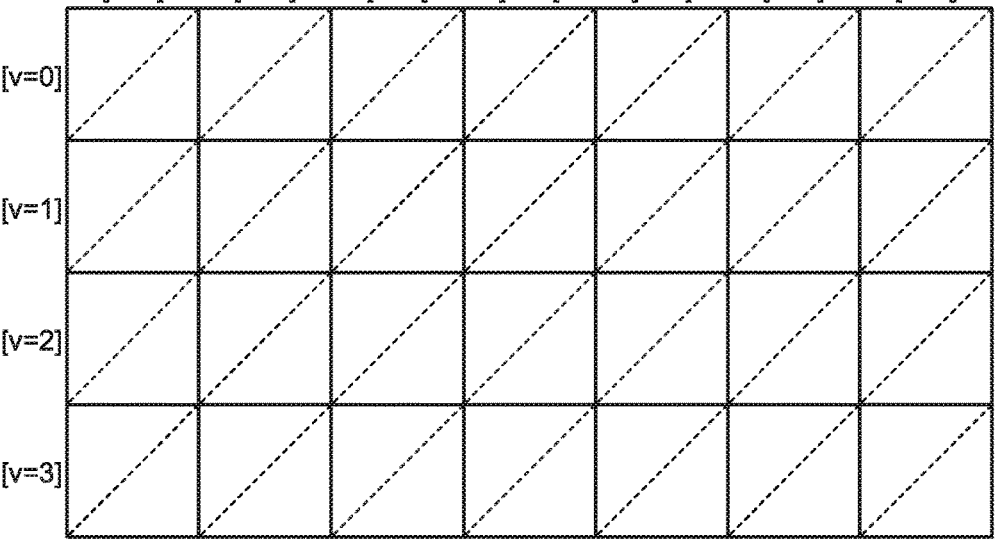
FIG. 30 is a schematic diagram illustrating a setting example of the segment areas and the subsegment areas of the image display panel according to a fourth modification.

FIG. 30 is a schematic diagram illustrating a setting example of the segment areas and the subsegment areas of the image display panel 30 according to a fourth modification. The number of the dividing lines for dividing one segment area into a plurality of subsegment areas is not limited to two. For example, as illustrated in FIG. 30, the number of the dividing lines for dividing one segment area into a plurality of subsegment areas may be one, the dividing lines being represented by dotted lines. The fourth modification illustrated in FIG. 30 gives an example in which only one of the two dividing lines illustrated in FIG. 29 is employed. The other of the two dividing lines may be employed. Either configuration of the first and second embodiments may be employed for the resetting of the luminance. In this case, in the adjacent light source lighting amount correction, using a light source of a segment area facing a side of the subsegment area has higher priority.

3-5. Fifth Modification

Figure 31:
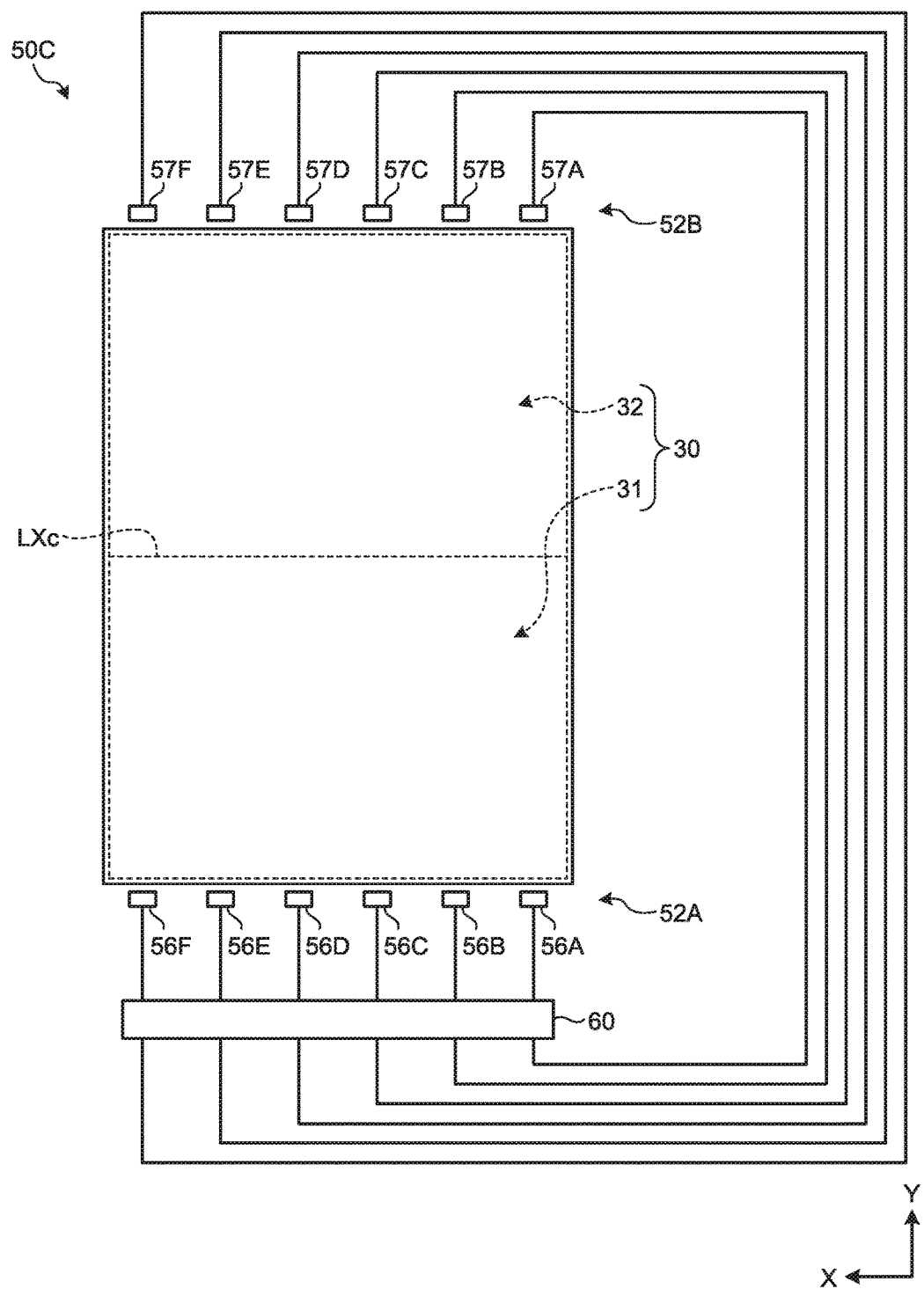
FIG. 31 is a diagram illustrating a configuration example of a light source device according to a fifth modification.

FIG. 31 is a diagram illustrating a configuration example of a light source device 50C according to a fifth modification. The light sources of the light source device 50C need not be provided directly below the segment areas. Specifically, as illustrated in FIG. 31, the light source device 50C may include a first sidelight light source 52A and a second sidelight light source 52B. The first sidelight light source 52A includes a plurality of light sources 56A, 56B, 56C, 56D, 56E, and 56F, and the second sidelight light source 52B includes a plurality of light sources 57A, 57B, 57C, 57D, 57E, and 57F. The first sidelight light source 52A and the second sidelight light source 52B are arranged so that the light sources 56A, 56B, 56C, 56D, 56E, and 56F and the light sources 57A, 57B, 57C, 57D, 57E, and 57F are axisymmetric to each other with respect to a center line LXc in the light input direction. The light sources 56A, 56B, 56C, 56D, 56E, 56F, 57A, 57B, 57C, 57D, 57E, and 57F are, for example, LEDs having the same color (such as white color). Either configuration of the first and second embodiments may be employed for the resetting of the luminance. The adjacent light source lighting amount correction of the example illustrated in FIG. 31 is performed on segment areas adjacent to respective subsegment areas in the X-direction. In FIG. 31, the light sources 56A, 56B, 56C, 56D, 56E, and 56F and the light sources 57A, 57B, 57C, 57D, 57E, and 57F extend along the X-direction, but may extend along the Y-direction. If the light sources extend along the Y-direction, the adjacent light source lighting amount correction is performed on segment areas adjacent to the respective subsegment areas in the Y-direction. The first sidelight light source 52A and the second sidelight light source 52B illuminate the image display panel 30, for example, through light guide plates. The light guide plates are provided on the back side of the image display panel 30, guide light in a direction orthogonal to the arrangement direction of the light sources 56A, 56B, 56C, 56D, 56E, and 56F and the light sources 57A, 57B, 57C, 57D, 57E, and 57F, and emit the light toward the image display panel 30. Only either of the first sidelight light source 52A and the second sidelight light source 52B needs to be provided. Each of the first sidelight light source 52A and the second sidelight light source 52B may include any number of light sources.

FIG. 32 is a schematic diagram illustrating a setting example of the segment areas and the subsegment areas of the image display panel 30 according to the fifth modification. In the case of the fifth modification, the segment area is divided into a plurality of subsegment areas only in the X-direction serving as the arrangement direction of the light sources 56A, 56B, 56C, 56D, 56E, and 56F and the light sources 57A, 57B, 57C, 57D, 57E, and 57F. This corresponds to the arrangement direction of the light sources 56A, 56B, 56C, 56D, 56E, and 56F and the light sources 57A, 57B, 57C, 57D, 57E, and 57F included in the first sidelight light source 52A and the second sidelight light source 52B. The resetting and the correction may performed by providing the subsegment areas with respect to one direction as exemplified in the fifth modification.

In the fifth modification, a partial area 31 of the image display panel 30 illustrated in FIG. 31 corresponds to [v=0] and [v=1] in FIG. 32. A partial area 32 of the image display panel 30 illustrated in FIG. 31 corresponds to [v=2] and [v=3] in FIG. 32. The light sources 56A to 56F and the light sources 57A to 57F are located, for example, on border lines dividing segment areas of [h=0] to [h=6], respectively. That is, in the fifth modification, one light source is shared by two or more segment areas.

While the first and second embodiments and the modifications thereof (embodiments and the like) have been described above, the embodiments and the like are not limited thereto. For example, three or more light sources may be assigned to one segment area. The number of subsegment areas included in one segment area is not limited to two or four, but may be three, or five or more. The pattern of the dividing lines for dividing one segment area into a plurality of subsegment areas is not limited to the examples of the embodiments and the like, but may be any pattern. While each of a plurality of segment areas is illuminated by one or more light sources, each of a plurality of light sources need not be assigned to one of the segment areas. For example, as illustrated in FIG. 31, a plurality of segment areas may share the light source 56A or the like.

Other operational advantages accruing from the aspects described in the embodiments and the like that are obvious from the description herein, or that are appropriately conceivable by those skilled in the art will naturally be understood as accruing from the present invention.

What is claimed is:

1. A display device comprising:
an image display panel having a display area in which display is controlled based on an image signal;
a light source device configured to illuminate the image display panel with a plurality of light sources; and
a controller configured to control a lighting amount of each of the light sources based on the image signal,
wherein the display area includes a plurality of segment areas each illuminated by one or more of the light sources,
wherein each of the segment areas includes a plurality of subsegment areas that are obtained by further dividing the segment area, and
wherein the controller is configured to:
calculate luminance required for each of the subsegment areas, based on the image signal for each of the subsegment areas;
temporarily set luminance values of the respective segment areas for determining the lighting amounts of the light sources based on maximum luminance among the required luminance values of the respective subsegment areas included in each of the segment areas; and
reset, based on at least the maximum luminance among the required luminance values of the respective subsegment areas included in each of the segment areas, the luminance value of at least the segment area adjacent to the corresponding subsegment area having the required luminance of the maximum luminance.

2. The display device according to claim 1,
wherein the controller is configured to correct, based on the luminance of the segment area after being reset and at least the maximum luminance among the required luminance values of the respective subsegment areas included in the segment area, the lighting amount of the light source illuminating the segment area within a range equal to or lower than a predetermined second upper limit luminance.

3. The display device according to claim 1,
wherein the controller is configured to reset, when reset luminance calculated by multiplying the required luminance of the subsegment area by a predetermined coefficient is higher than the luminance of the segment area adjacent to the subsegment area, the luminance of the segment area to the reset luminance.

4. The display device according to claim 1,
wherein the segment areas are arranged along at least one direction.

5. The display device according to claim 4,
wherein the light source device includes a plurality of light source columns in which a plurality light sources are arranged along the one direction.

6. The display device according to claim 5,
wherein the segment areas are arranged along two orthogonal directions.

7. The display device according to claim 5,
wherein the segment areas are arranged in a staggered manner along another direction orthogonal to the one direction.

8. The display device according to claim 6,
wherein each of the segment areas includes four subsegment areas defined by two dividing lines each halving the segment area in one of two orthogonal directions.

9. The display device according to claim 7,
wherein each of the segment areas includes four subsegment areas defined by two dividing lines each halving the segment area in one of two orthogonal directions.

10. The display device according to claim 8,
wherein one of the two dividing lines extends along the one direction.

11. The display device according to claim 9,
wherein one of the two dividing lines extends along the one direction.

12. The display device according to claim 8,
wherein the two dividing lines do not extend along the one direction.

13. The display device according to claim 9,
wherein the two dividing lines do not extend along the one direction.

14. The display device according to claim 1,
wherein each of the light sources is assigned to one of the segment areas.

15. The display device according to claim 14,
wherein two or more light sources are assigned to each of the segment areas.

16. A method for driving a display device comprising an image display panel having a display area in which display is controlled based on an image signal and a light source device configured to illuminate the image display panel with a plurality of light sources, the method comprising:
setting a plurality of segment areas each assigned with one or more light sources in the display area, each of the segment areas including a plurality of subsegment areas that are obtained by further dividing the segment area;
assigning each of the light sources to a corresponding one of the segment areas;
calculating luminance required for each of the subsegment areas, based on the image signal for each of the subsegment areas;
setting luminance values of the respective segment areas for determining lighting amounts of the light sources based on maximum luminance among the required luminance values of the respective subsegment areas included in each of the segment areas; and resetting the luminance value of an adjacent segment area based on the maximum luminance, the adjacent segment area being adjacent to one of the segment areas and adjacent to a subsegment area for which the maximum luminance has been calculated among the subsegment areas included in the segment area.

\* \* \* \* \*